United States Patent
Barriac et al.

(10) Patent No.: US 9,544,904 B2
(45) Date of Patent: Jan. 10, 2017

(54) SYSTEMS AND METHODS FOR REUSE OF A WIRELESS MEDIUM FOR HIGH EFFICIENCY WIFI

(71) Applicant: QUALCOMM Incorporated, San Diego, CA (US)

(72) Inventors: Gwendolyn Denise Barriac, Encinitas, CA (US); Simone Merlin, Solana Beach, CA (US); Sameer Vermani, San Diego, CA (US); Rahul Tandra, San Diego, CA (US); Yan Zhou, San Diego, CA (US); Bin Tian, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 14/265,112

(22) Filed: Apr. 29, 2014

(65) Prior Publication Data
US 2014/0328191 A1 Nov. 6, 2014

Related U.S. Application Data

(60) Provisional application No. 61/819,225, filed on May 3, 2013.

(51) Int. Cl.
*H04B 7/00* (2006.01)
*H04W 72/04* (2009.01)
(Continued)

(52) U.S. Cl.
CPC ......... *H04W 72/048* (2013.01); *H04W 52/241* (2013.01); *H04W 74/0808* (2013.01)

(58) Field of Classification Search
CPC ......... H04W 4/08; H04W 16/24; H04W 24/02
(Continued)

(56) References Cited

U.S. PATENT DOCUMENTS

| 7,436,801 B1 | 10/2008 | Kanterakis |
| 8,165,149 B2 | 4/2012 | Diepstraten et al. |

(Continued)

FOREIGN PATENT DOCUMENTS

| EP | 2302964 A1 | 3/2011 |
| EP | 2490500 A1 | 8/2012 |

(Continued)

OTHER PUBLICATIONS

International Search Report and Written Opinion—PCT/US2014/036157—ISA/EPO—Aug. 22, 2014.

(Continued)

*Primary Examiner* — Dmitry H Levitan
(74) *Attorney, Agent, or Firm* — Knobbe Martens Olson & Bear, LLP

(57) ABSTRACT

Systems and method for concurrent communication using high efficiency wifi are disclosed. One aspect is a method of transmitting a wireless message on a medium utilizing carrier sense multiple access (CSMA). The method includes receiving, via a first wireless device, at least a portion of a first wireless message from a second wireless device, the message including an indication of a basic service set of the second wireless device. The method also includes determining whether to defer transmission of a second wireless message based, at least in part, on the basic service set of the second wireless device.

38 Claims, 16 Drawing Sheets

(51) Int. Cl.
*H04W 52/24* (2009.01)
*H04W 74/08* (2009.01)

(58) Field of Classification Search
USPC .................................. 370/310, 328, 329, 349
See application file for complete search history.

(56) References Cited

U.S. PATENT DOCUMENTS

| | | | |
|---|---|---|---|
| 8,184,655 B2 * | 5/2012 | Roy | H04W 74/0808 370/230 |
| 8,306,003 B2 * | 11/2012 | Ramesh | H04W 74/0866 370/338 |
| 8,331,951 B2 | 12/2012 | Zhang et al. | |
| 8,355,389 B2 | 1/2013 | Kasslin et al. | |
| 8,498,578 B2 | 7/2013 | Abraham et al. | |
| 8,522,088 B2 | 8/2013 | Kim et al. | |
| 2006/0268924 A1 * | 11/2006 | Marinier | H04W 52/241 370/445 |
| 2007/0060155 A1 | 3/2007 | Kahana et al. | |
| 2007/0133489 A1 | 6/2007 | Ramesh et al. | |
| 2007/0270102 A1 | 11/2007 | Zhu et al. | |
| 2009/0207747 A1 | 8/2009 | Kim et al. | |
| 2011/0110340 A1 | 5/2011 | Lakkis | |
| 2011/0194644 A1 | 8/2011 | Liu et al. | |
| 2011/0305156 A1 | 12/2011 | Liu et al. | |
| 2012/0082109 A1 | 4/2012 | Hong et al. | |
| 2012/0093134 A1 | 4/2012 | Zuniga et al. | |
| 2012/0099450 A1 | 4/2012 | Madan et al. | |
| 2012/0163349 A1 * | 6/2012 | Fontaine | H04W 72/1263 370/336 |
| 2012/0207074 A1 | 8/2012 | Kneckt | |
| 2012/0314583 A1 | 12/2012 | Hart et al. | |
| 2012/0327870 A1 | 12/2012 | Grandhi et al. | |
| 2013/0017794 A1 | 1/2013 | Kloper et al. | |
| 2013/0051260 A1 | 2/2013 | Liu | |
| 2013/0058218 A1 | 3/2013 | Wu et al. | |
| 2013/0070627 A1 * | 3/2013 | Chen | H04W 74/08 370/252 |
| 2013/0136013 A1 | 5/2013 | Kneckt et al. | |
| 2013/0171999 A1 | 7/2013 | Katar et al. | |
| 2013/0182784 A1 | 7/2013 | Wang et al. | |
| 2013/0203429 A1 | 8/2013 | Kneckt et al. | |
| 2013/0235737 A1 | 9/2013 | Merlin et al. | |
| 2014/0050156 A1 | 2/2014 | Chan et al. | |
| 2014/0064101 A1 | 3/2014 | Hart et al. | |
| 2014/0071959 A1 * | 3/2014 | Ghosh | H04W 72/0426 370/336 |
| 2014/0177546 A1 * | 6/2014 | Kang | H04L 5/06 370/329 |
| 2014/0328192 A1 | 11/2014 | Barriac et al. | |
| 2014/0328268 A1 | 11/2014 | Zhu et al. | |
| 2014/0328269 A1 | 11/2014 | Zhu et al. | |
| 2014/0328270 A1 | 11/2014 | Zhu et al. | |
| 2015/0078299 A1 | 3/2015 | Barriac et al. | |
| 2015/0124744 A1 | 5/2015 | Zhu et al. | |

FOREIGN PATENT DOCUMENTS

| | | |
|---|---|---|
| WO | WO-2006115823 A2 | 11/2006 |
| WO | WO-2007027442 A2 | 3/2007 |
| WO | WO-2011053775 A1 | 5/2011 |
| WO | WO-2013012263 A1 | 1/2013 |
| WO | WO-2013012807 A1 | 1/2013 |
| WO | WO-2013033692 A1 | 3/2013 |

OTHER PUBLICATIONS

Merlin S., et al., "Systems and Methods for Extending the Range of Wireless Communications," U.S. Appl. No. 61/722,008, filed Nov. 2, 2012, pp. 48.

Charfi E., et al., "Upcoming WLANs MAC Access Mechanisms: An Overview", Communication Systems, Networks & Digital Signal Processing (CSNDSP), 2012 8th International Symposium on, IEEE, Jul. 18, 2012 (Jul. 18, 2012), pp. 1-6, XP032237054, DOI: 10.1109/CSNDSP.2012.6292711, ISBN: 978-1-4577-1472-6.

Taiwan Search Report—TW103115731—TIPO—Aug. 22, 2015.

* cited by examiner

SYSTEMS AND METHODS FOR REUSE OF A WIRELESS MEDIUM FOR HIGH EFFICIENCY WIFI

CROSS-REFERENCE TO RELATED APPLICATIONS

This application claims the benefit of U.S. Provisional Application No. 61/819,225, filed May 3, 2013, and entitled "SYSTEMS AND METHODS FOR REUSE OF A WIRELESS MEDIUM FOR HIGH EFFICIENCY WIFI," and assigned to the assignee hereof. The disclosure of this prior application is considered part of this application, and is hereby incorporated by reference in its entirely.

BACKGROUND

Field

The present application relates generally to wireless communications, and more specifically to systems, methods, and devices for concurrent communications and higher wireless throughput using high efficiency WiFi.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (e.g., because each wireless network is operating in the same area and/or spectrum), and/or prevent certain devices from communicating. Thus, improved systems, methods, and devices for communicating when wireless networks are densely populated is desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect disclosed is a method of transmitting a wireless message on a medium utilizing carrier sense multiple access (CSMA). Another aspect disclosed is a computer readable storage medium comprising instructions that when executed cause one or more processors to perform the above referenced method.

The method includes receiving, via a first wireless device, at least a portion of a first wireless message transmitted by a second wireless device, the message comprising one or more indications, the indications comprising one or more of a type of destination device for the first wireless message, a basic service set (BSS) of the second wireless device, whether the second wireless device requests that receiving devices defer transmissions during transmission of the first wireless message, and an attribute of a waveform of the first wireless message, determining whether to defer transmission of a second wireless message to a third wireless device based, at least in part, on one or more of the indications; and transmitting the second wireless message to the third wireless device based on the determining. In some aspects, the determining whether to defer is further based on at least an indication of transmission deferral rules received from an access point or a controller. In some aspects, the determining whether to defer is further based on a type of the first wireless device. In some aspects, the indication of a type of the destination device for the first wireless message indicates the destination device is either an access point or a station.

In some aspects, the portion of the first wireless message further comprises an indication of a transmit power of the first wireless message, wherein the determining whether to defer is further based on the transmit power indication. In some aspects, the basic service set of the second wireless device is different than the basic service set of the first wireless device, and transmission of the second wireless message is not deferred based on the difference. In some aspects, determining whether to defer transmission of the second wireless message is based at least in part on the type of destination device for the first wireless message, the type of the first wireless device, and whether the BSS of the second wireless device and the BSS of the first wireless device are equivalent. In some aspects, transmission of the second wireless message is not deferred if the first wireless device is an access point, the destination device for the first wireless message is a station, and the BSSs are different.

In some aspects, transmission of the second wireless message is not deferred if the first wireless device is an access point, the destination device for the first wireless message is an access point, and the BSSs are different. In some aspects, the determining is further based on a distance between the first wireless device and the third wireless device. In some aspects, the determining is based on whether the BSS of the second wireless device and the BSS of the first wireless device are different, and whether a deferral request is indicated by the first wireless message. In some aspects, the determining is further based on whether the first wireless device is an access point or a station, and whether the third wireless device is an access point or a station.

In some aspects, transmission of the second wireless message is not deferred if the BSSs are different, deferral is requested in the first wireless message, the first wireless device is an access point, and a distance between the first and third wireless devices is below a distance threshold. In some aspects, transmission of the second wireless message is not deferred if the BSSs are different, deferral is requested in the first wireless message, the first wireless device is an access point, and the destination device of the first wireless message is an access point.

Another aspect disclosed is an apparatus for transmitting a wireless message on a medium utilizing carrier sense multiple access (CSMA). The apparatus includes a receiver configured to receive at least a portion of a first wireless message from a first wireless device, the message comprising one or more indications, the indications comprising one or more of a type of destination device of the first wireless message, a basic service set of the first wireless device, whether the first wireless device requests that receiving devices defer transmissions during transmission of the first wireless message, and an attribute of a waveform of the first wireless message, a processor configured to determine whether to defer transmission of a second wireless message to a second wireless device based, at least in part, on one or more of the indications; and a transmitter configured to transmit the second wireless message to the second wireless device based on the determining. In some aspects of the apparatus, the indication of the type of destination of the first wireless message indicates the type of destination is an access point or a station. In some aspects of the apparatus, the processor is further configured to determine whether to defer based on at least an indication of transmission deferral rules received from an access point or a controller. In some aspects of the apparatus, the processor is further configured to determine whether to defer based on a type of the apparatus. In some aspects of the apparatus, the indication of the type of the destination device of the first wireless message indicates whether the destination device is an access point or a station. In some aspects of the apparatus, the first wireless message further comprises an indicator of a transmit power of the first wireless message, and wherein the processor is further configured to determine whether to defer based on the indicated transmit power. In some aspects of the apparatus, the processor is configured to determine not to defer transmission of the second message if the basic service set of the first wireless device is different than the basic service set of the apparatus.

In some aspects of the apparatus, the processor is configured to determine whether to defer transmission of the second wireless message based at least in part on the type of destination device for the first wireless message, the type of the apparatus, and whether the BSS of the first wireless device and the BSS of the apparatus are equivalent. In some aspects of the apparatus, transmission of the second wireless message is not deferred if the apparatus is an access point, the destination device for the first wireless message is a station, and the BSSs are different. In some aspects of the apparatus, transmission of the second wireless message is not deferred if the apparatus is an access point, the destination device for the first wireless message is an access point, and the BSSs are different. In some aspects of the apparatus, the processor is further configured to determine whether to defer based on a distance between the apparatus and the second wireless device. In some aspects of the apparatus, the processor is configured to determine whether to defer based on whether the first wireless device BSS and the BSS of the apparatus are different, and whether a deferral request is indicated in the first wireless message. In some aspects of the apparatus, the processor is configured to determine whether to defer based on whether the apparatus is an access point or a station, and whether the second wireless device is an access point or a station. In some aspects of the apparatus, the processor is configured to not defer transmission of the second wireless message if the BSSs are different, deferral is requested in the first wireless message, the apparatus is an access point, and a distance between the apparatus and the second wireless devices is below a distance threshold. In some aspects of the apparatus, the processor is configured to not defer transmission of the second wireless message if the BSSs are different, deferral is requested in the first wireless message, the apparatus is an access point, and the destination device of the first wireless message is an access point.

Another aspect disclosed is an apparatus for transmitting a wireless message on a medium utilizing carrier sense multiple access (CSMA). The apparatus includes means for receiving at least a portion of a first wireless message transmitted by a first wireless device, the message comprising one or more indications, the indications comprising one or more of a type of destination of the first wireless message, a basic service set of the first wireless device, whether the first wireless device requests that receiving devices defer transmissions during transmission of the first wireless message, and an attribute of a waveform of the first wireless message, means for determining whether to defer transmission of a second wireless message to a second wireless device based, at least in part, on one or more of the indications; and means for transmitting the second wireless message to the second wireless device based on the determining. In some aspects of the apparatus, the indication of the type of the destination indicates whether the destination is an access point or a station. In some aspects of the apparatus, the means for determining whether to defer is configured to further base the determining on at least an indication of transmission deferral rules received from an access point or a controller. In some aspects of the apparatus, the means for determining whether to defer is configured to further base the determining on a type of the apparatus. In some aspects of the apparatus, the indication of the type of the apparatus indicates whether the apparatus is an access point or a station. In some aspects of the apparatus, the first wireless message further indicates a transmit power of the first wireless message, and the means for determining whether to defer is configured to further base the determining on the transmit power indication.

In some aspects of the apparatus, the means for determining is configured not to defer transmission of the second message if the basic service set of the first wireless device is different than the basic service set of the apparatus. In some aspects of the apparatus, the means for determining is configured to determine whether to defer transmission of the second wireless message based at least in part on the type of destination device for the first wireless message, the type of the apparatus, and whether the BSS of the first wireless device and the BSS of the apparatus are equivalent. In some aspects of the apparatus, transmission of the second wireless message is not deferred if the first wireless device is an access point, the destination device for the first wireless message is a station, and the BSSs are different. In some aspects of the apparatus, transmission of the second wireless message is not deferred if the apparatus is an access point, the first wireless device is an access point, and the BSSs are different.

In some aspects of the apparatus, the means for determining is further configured to determine whether to defer based on a distance between the apparatus and the second wireless device. In some aspects of the apparatus, the means for determining is further configured to determine whether to defer based on whether the first wireless device BSS and BSS of the apparatus are different, and whether a deferral request is indicated in the first wireless message. In some aspects of the apparatus, the means for determining is configured to determine whether to defer based on whether the apparatus is an access point or a station, and whether the second wireless device is an access point or a station.

In some aspects of the apparatus, the means for determining is configured to not defer transmission of the second wireless message if the BSSs are different, deferral is requested in the first wireless message, the apparatus is an access point, and a distance between the apparatus and the second wireless device is below a distance threshold. In some aspects of the apparatus, the means for determining is configured to not defer transmission of the second wireless message if the BSSs are different, deferral is requested in the first wireless message, the apparatus is an access point, and the first wireless device is an access point.

Another aspect disclosed is a method of transmitting a message within a dense wireless network, the wireless network utilizing carrier sense media access. The method includes generating, via a first wireless device, a first wireless message, the message comprising one or more indications, the indications comprising one or more of a type of destination device of the first wireless message, and whether the first wireless device requests that devices receiving the first wireless message defer their own transmissions during transmission of the first wireless message; and transmitting the first wireless message. In some aspects of the method, the type of destination device indicates whether the destination device is a station or an access point.

Another aspect disclosed is an apparatus for transmitting a message within a dense wireless network, the wireless network utilizing carrier sense media access. The apparatus comprises a processor configured to generate a first wireless message, the message comprising one or more indications, the indications comprising one or more of a type of destination of the first wireless message, and whether the apparatus requests that devices receiving the first wireless message defer their own transmissions during transmission of the first wireless message; and a transmitter configured to transmit the first wireless message. In some aspects of the apparatus, the type of destination device indicates whether the destination device is a station or an access point.

Another aspect disclosed is an apparatus for transmitting a message within a dense wireless network, the wireless network utilizing carrier sense media access. The apparatus includes means for generating a first wireless message, the message comprising one or more indications, the indications comprising one or more of a type of destination device of the first wireless message and whether the apparatus requests that receiving devices defer their own transmissions during transmission of the first wireless message; and means for transmitting the first wireless message. In some aspects, the type of destination device indicates whether the destination device is a station or an access point.

Another aspect disclosed is a computer readable storage medium comprising instructions that when executed cause one or more processor to perform a method of transmitting a message within a dense wireless network, the wireless network utilizing carrier sense media access. The method includes generating, via a first wireless device, a first wireless message, the message comprising one or more indications, the indications comprising one or more of a type of destination device of the first wireless message, and whether the first wireless device requests that devices receiving the first wireless message defer their own transmissions during transmission of the first wireless message; and transmitting the first wireless message. In some aspects, of the method, the type of destination device indicates whether the destination device is a station or an access point.

Another aspect disclosed is a method of transmitting a wireless message in a dense wireless networking environment and on a medium utilizing carrier sense multiple access (CSMA). The method includes receiving, via a wireless device, at least a portion of a first wireless message; determining whether to defer transmission by a transmitter of a second wireless message until at least reception of the first wireless message is complete based, at least in part, on one or more of a physical distance between the transmitter and a destination of the second wireless message, a type of the destination of the second wireless message, and a type of the wireless device; and transmitting the second wireless message based on the determining.

In some aspects of the method, transmission of the second wireless message is not deferred if the physical distance is less than a threshold. In some aspects of the method, transmission of the second wireless message is not deferred if the type of the wireless device is an access point. In some aspects of the method, transmission of the second wireless message is not deferred if the type of the wireless device is a station.

In some aspects of the method, transmission is not deferred if the type of the wireless device is a station and the physical distance is less than a threshold.

Another aspect disclosed is an apparatus for transmitting a wireless message in a dense wireless networking environment and on a medium utilizing carrier sense multiple access (CSMA). The apparatus includes a receiver configured to receive at least a portion of a first wireless message, a processor configured to determine whether to defer transmission by a transmitter of a second wireless message until at least reception of the first wireless message is complete based at least in part, on one or more of a physical distance between the apparatus and a destination of the second wireless message, a type of the destination device of the second wireless message, and a type of the apparatus; and the transmitter, wherein the transmitter is configured to transmit the second wireless message based on the determining.

In some aspects of the apparatus, the processor is further configured to determine to not defer transmission of the second wireless message if the physical distance is less than a threshold. In some aspects of the apparatus, the processor is further configured to determine to not defer transmission of the second wireless message if the type of the apparatus is an access point. In some aspects, the processor is further configured to determine to not defer transmission of the second wireless message if the type of the apparatus is a station. In some aspects, the processor is further configured to determine to not defer transmission of the second wireless message if the type of the apparatus is a station and the physical distance is less than a threshold.

Another aspect disclosed is an apparatus for transmitting a wireless message in a dense wireless networking environment and on a medium utilizing carrier sense multiple access (CSMA). The apparatus includes means for receiving, via a wireless device, at least a portion of a first wireless message, means for determining whether to defer transmission of a second wireless message until at least reception of the first wireless message is complete based at least in part, on one or more of a physical distance between the apparatus and a destination of the second wireless message, a type of the destination of the second wireless message, and a type of the apparatus; and means for transmitting the second wireless message based on the determining.

In some aspects of the apparatus, the means for determining determines not to defer transmission of the second wireless message if the physical distance is less than a threshold. In some aspects of the apparatus, the means for determining determines not to defer transmission of the second wireless message if the type of the apparatus is an access point. In some aspects of the apparatus, the means for determining determines not to defer transmission of the second wireless message if the type of the apparatus is a station. In some aspects of the apparatus, the means for determining determines not to defer transmission of the second wireless message if the type of the apparatus is a station and the physical distance is less than a threshold.

Another aspect disclosed is a computer readable storage medium comprising instructions that when executed cause one or more processors to perform a method of transmitting a wireless message in a dense wireless networking environment and on a medium utilizing carrier sense multiple access (CSMA). The method includes receiving, via a wireless device, at least a portion of a first wireless message, determining whether to defer transmission by a transmitter of a second wireless message until at least reception of the first wireless message is complete based at least in part, on one or more of a physical distance between the transmitter and a destination of the second wireless message, a type of the destination of the second wireless message, and a type of the wireless device; and transmitting the second wireless message based on the determining.

In some aspects of the method, transmission of the second wireless message is not deferred if the physical distance is less than a threshold. In some aspects of the method, transmission of the second wireless message is not deferred if the type of the wireless device is an access point. In some aspects of the method, transmission of the second wireless message is not deferred if the type of the wireless device is a station. In some aspects of the method, transmission is not deferred if the type of the wireless device is a station and the physical distance is less than a threshold.

DETAILED DESCRIPTION

Figure 1:
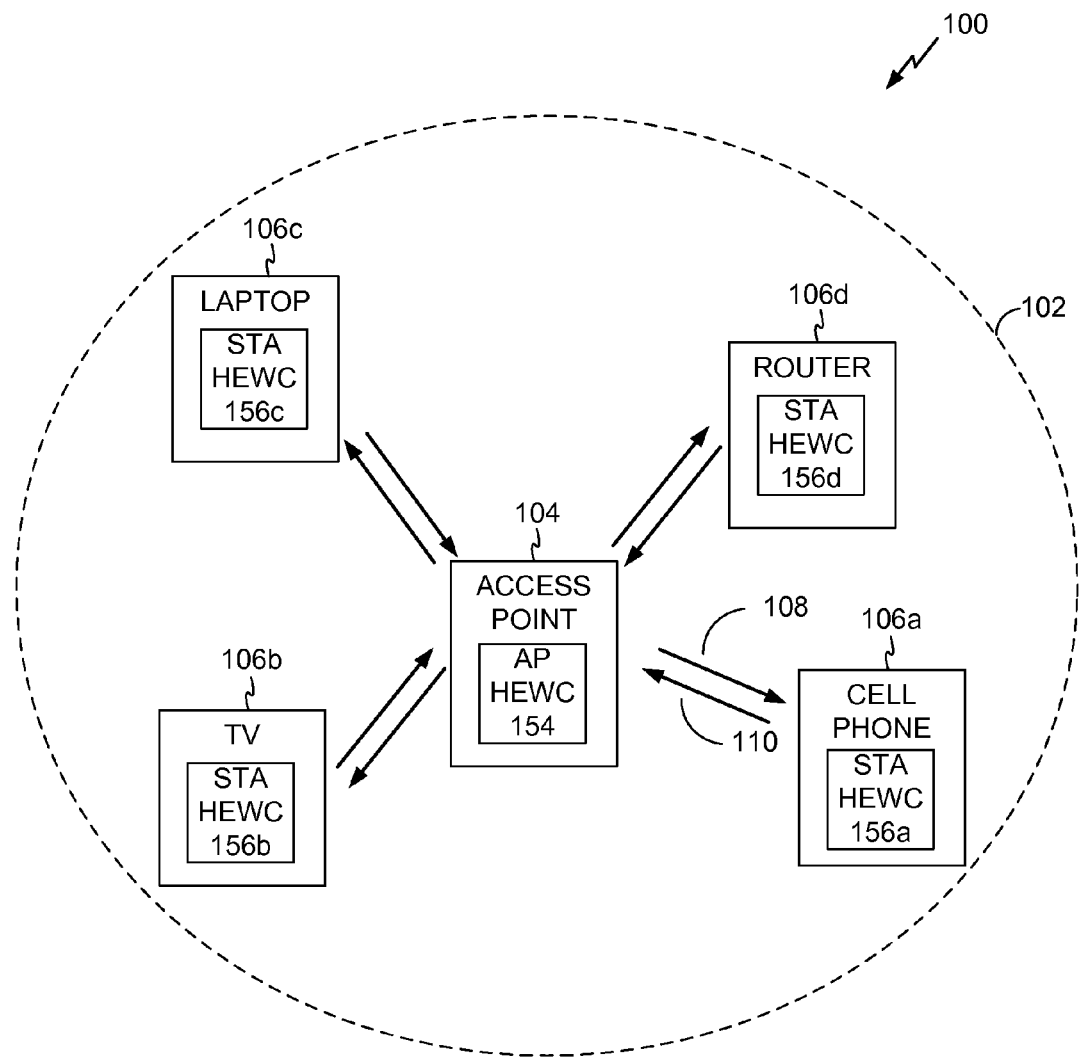
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example a high-efficiency 802.11 standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of the AP HEWC 154 is described in greater detail below with respect to FIGS. 2B, 3, 4, 5, 6B, 7B, and 8B.

Alternatively or in addition, the STAs 106 may include a STA HEWC 156. The STA HEWC 156 may perform some or all of the operations described herein to enable communications between the STAs 106 and the AP 104 using the high-frequency 802.11 protocol. The functionality of the STA HEWC 156 is described in greater detail below with respect to FIGS. 2B, 3, 4, 5, 6B, 7B, and 8B

Figure 2A:
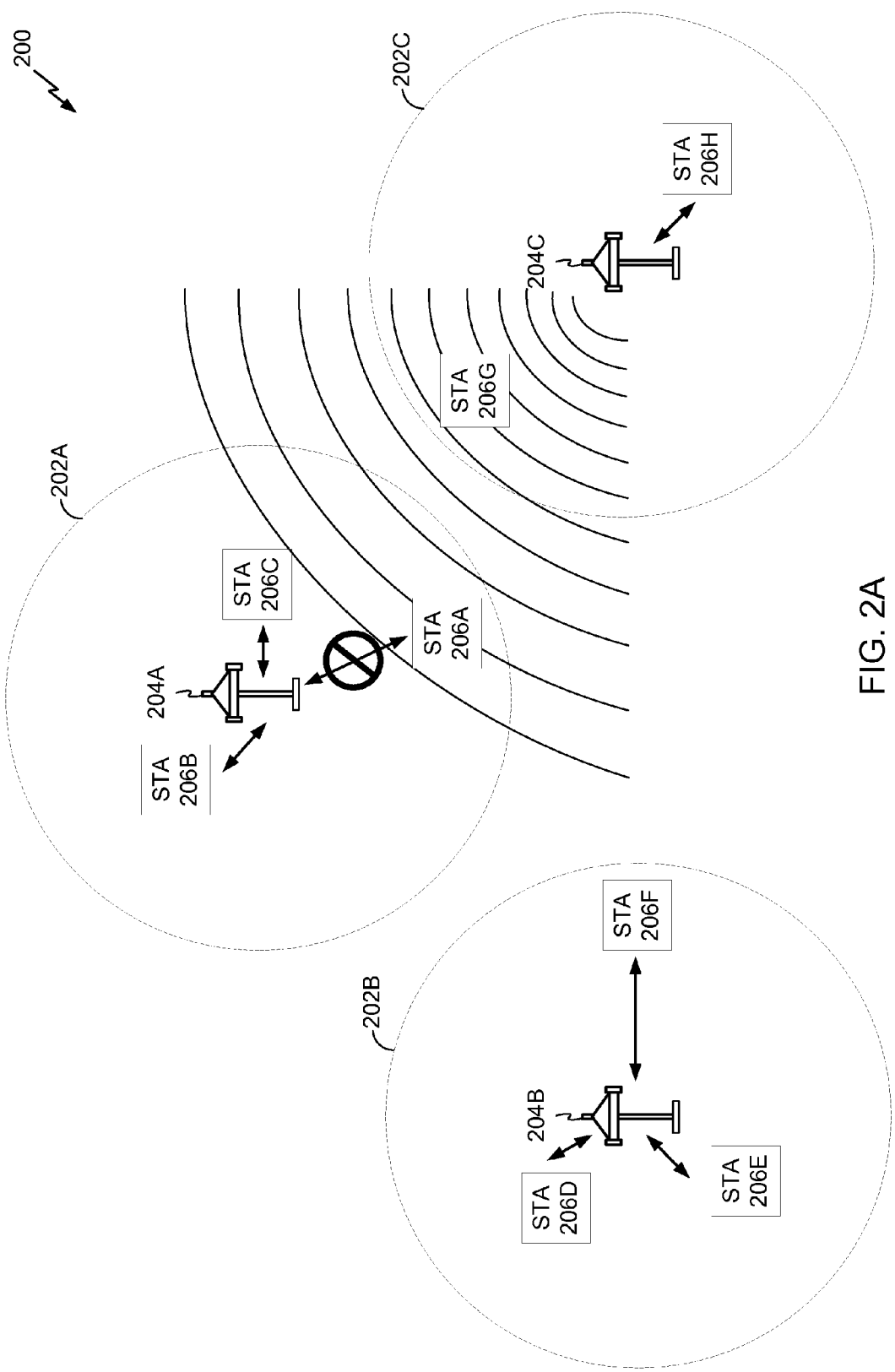
FIG. 2A shows a wireless communication system in which multiple wireless communication networks are present.

In some circumstances, a BSA may be located near other BSAs. For example, FIG. 2A shows a wireless communication system 200 in which multiple wireless communication networks are present. As illustrated in FIG. 2A, BSAs 202A, 202B, and 202C may be physically located near each other. Despite the close proximity of the BSAs 202A-C, the APs 204A-C and/or STAs 206A-H may each communicate using the same spectrum. Thus, if a device in the BSA 202C (e.g., the AP 204C) is transmitting data, devices outside the BSA 202C (e.g., APs 204A-B or STAs 206A-F) may sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-C and/or STAs 206A-H are operating according to the CSMA mechanism and a device in the BSA 202C (e.g., the AP 204C) is transmitting data, then the APs 204A-B and/or STAs 206A-F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission may be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same may apply to STAs 206D-F in the BSA 202B and/or STAs 206B-C in the BSA 202A as well (e.g., if the transmission by the AP 204C is stronger such that the other STAs can sense the transmission on the medium).

The use of the CSMA mechanism then creates inefficiencies because some APs or STAs outside of a BSA may be able to transmit data without interfering with a transmission made by an AP or STA in the BSA. As the number of active wireless devices continues to grow, the inefficiencies may begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not even be confined to residential areas. For example, multiple access points may be located in airports, subway stations, and/or other densely-populated public spaces. Currently, WiFi access may be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 2B, 3, and 4. Additional aspects of the high-efficiency 802.11 protocol are described below with respect to FIGS. 5-8B.

Figure 2B:
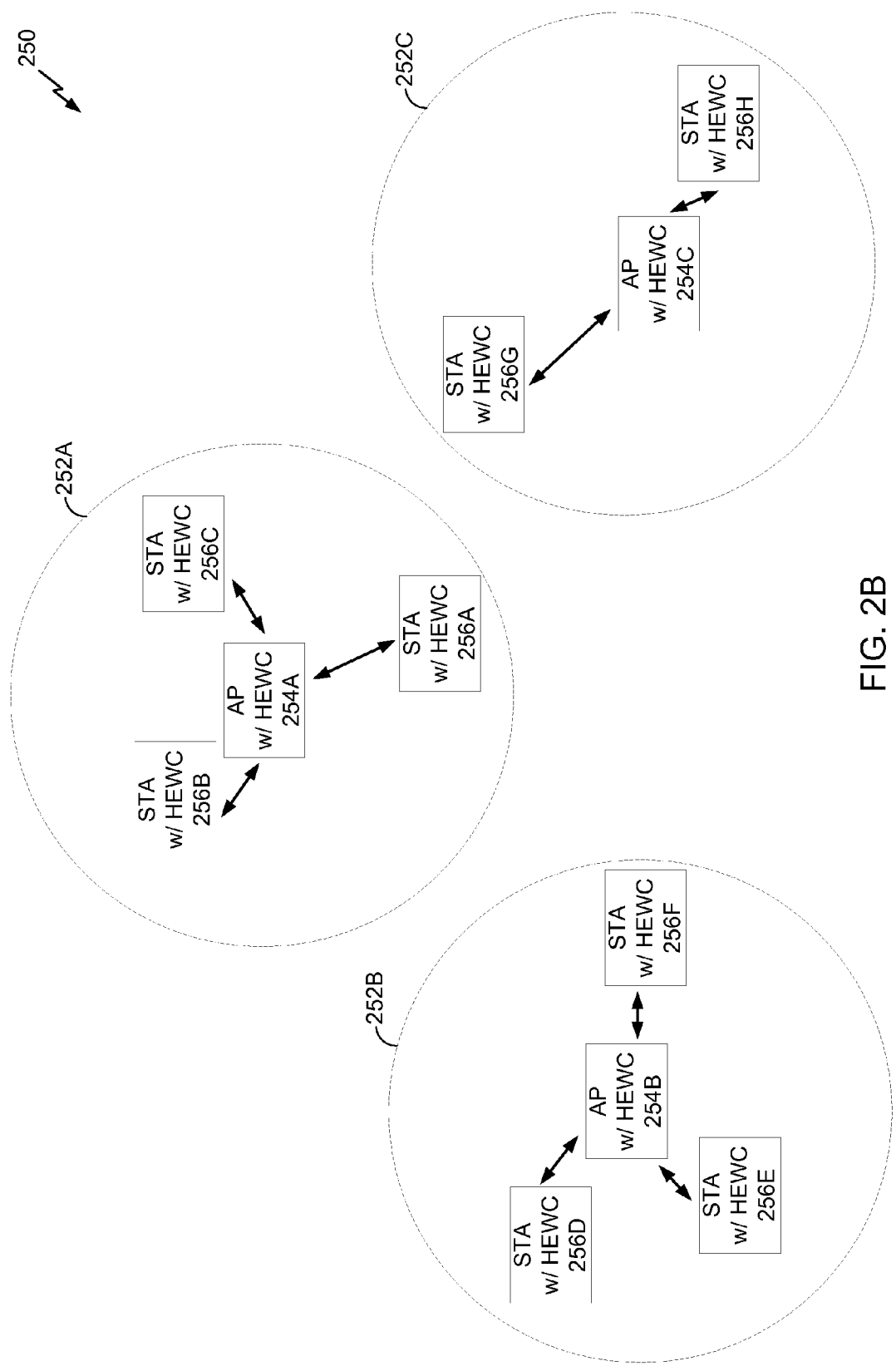
FIG. 2B shows another wireless communication system in which multiple wireless communication networks are present.

FIG. 2B shows a wireless communication system 250 in which multiple wireless communication networks are present. Unlike the wireless communication system 200 of FIG. 2A, the wireless communication system 250 may operate pursuant to the high-efficiency 802.11 standard discussed herein. The wireless communication system 250 may include an AP 254A, an AP 254B, and an AP 254C. The AP 254A may communicate with STAs 256A-C, the AP 254B may communicate with STAs 256D-F, and the AP 254C may communicate with STAs 256G-H.

A variety of processes and methods may be used for transmissions in the wireless communication system 250 between the APs 254A-C and the STAs 256A-H. For example, signals may be sent and received between the APs 254A-C and the STAs 256A-H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP 254A, 254B, or 254C, but rather may allow for peer-to-peer communications between one or more of the STAs 256A-H. Accordingly, the functions of the AP 254A-C described herein may alternatively be performed by one or more of the STAs 256A-H.

In an embodiment, the APs 254A-C and/or STAs 256A-H include a high-efficiency wireless component. As described herein, the high-efficiency wireless component may enable communications between the APs and STAs using the high-efficiency 802.11 protocol. In particular, the high-efficiency wireless component may enable the APs 254A-C and/or STAs 256A-H to use a modified mechanism that minimizes the inefficiencies of the CSMA mechanism (e.g., enables concurrent communications over the medium in situations in which interference would not occur). The high-efficiency wireless component is described in greater detail below with respect to FIG. 4.

As illustrated in FIG. 2B, the BSAs 252A-C are physically located near each other. When, for example, AP 254A and STA 256B are communicating with each other, the communication may be sensed by other devices in BSAs 252B-C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. Such classification of devices may be performed by the high-efficiency wireless component in the APs 254A-C and/or the STAs 256A-H.

In an embodiment, the determination of whether a device can communicate concurrently with other devices is based on a location of the device. For example, a STA that is located near an edge of the BSA may be in a state or condition such that the STA cannot communicate concurrently with other devices. As illustrated in FIG. 2B, STAs 206A, 206F, and 206G may be devices that are in a state or condition in which they cannot communicate concurrently with other devices. Likewise, a STA that is located near the center of the BSA may be in a station or condition such that the STA can communicate with other devices. As illustrated in FIG. 2, STAs 206B, 206C, 206D, 206E, and 206H may be devices that are in a state or condition in which they can communicate concurrently with other devices. Note that the classification of devices is not permanent. Devices may transition between being in a state or condition such that they can communicate concurrently and being in a state or condition such that they cannot communicate concurrently (e.g., devices may change states or conditions when in motion, when associating with a new AP, when disassociating, etc.).

Furthermore, devices may be configured to behave differently based on whether they are ones that are or are not in a state or condition to communicate concurrently with other devices. For example, devices that are in a state or condition such that they can communicate concurrently may communicate within the same spectrum. However, devices that are in a state or condition such that they cannot communicate concurrently may employ certain techniques, such as spatial multiplexing or frequency domain multiplexing, in order to communicate over the medium. The controlling of the behavior of the devices may be performed by the high-efficiency wireless component in the APs 254A-C and/or the STAs 256A-H.

In an embodiment, devices that are in a state or condition such that they cannot communicate concurrently use spatial multiplexing techniques to communicate over the medium.

In other embodiments, power and/or other information may be embedded within the preamble of a packet transmitted by another device. A device in a state or condition such that the device cannot communicate concurrently may analyze the preamble when the packet is sensed on the medium and decide whether or not to transmit based on a set of rules.

Figure 3:
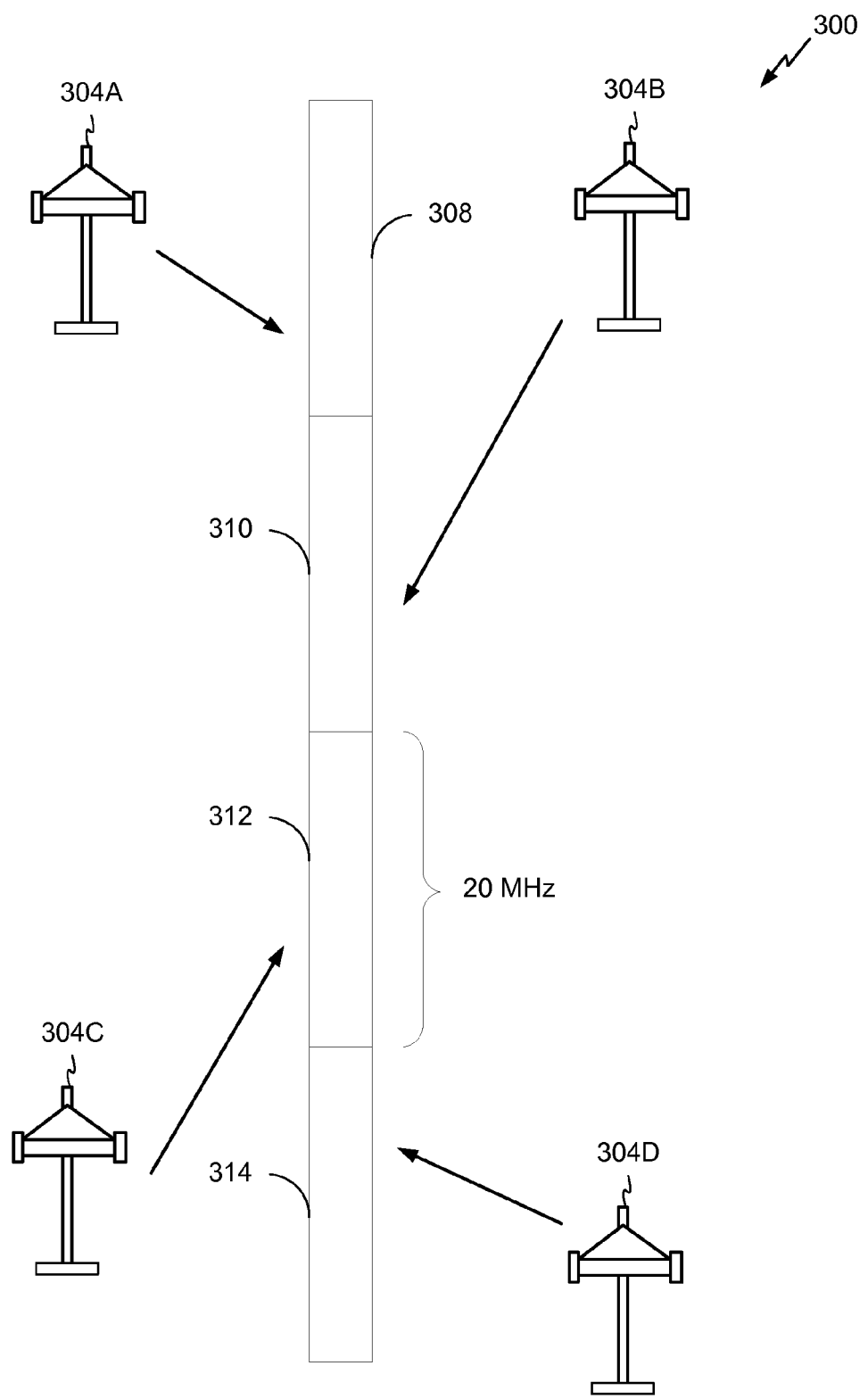
FIG. 3 shows frequency multiplexing techniques that may be employed within the wireless communication systems of FIGS. 1 and 2B.

In another embodiment, devices that are in a state or condition such that they cannot communicate concurrently use frequency domain multiplexing techniques to communicate over the medium. FIG. 3 shows frequency multiplexing techniques that may be employed within the wireless communication systems 100 of FIG. 1 and 250 of FIG. 2B. As illustrated in FIG. 3, an AP 304A, 304B, 304C, and 304D may be present within a wireless communication system 300. Each of the APs 304A, 304B, 304C, and 304D may be associated with a different BSA and include the high-efficiency wireless component described herein.

As an example, the bandwidth of the communication medium may be 80 MHz. Under the regular 802.11 protocol, each of the APs 304A, 304B, 304C, and 304D and the STAs associated with each respective AP attempt to communicate using the entire bandwidth, which can reduce throughput. However, under the high-efficiency 802.11 protocol using frequency domain multiplexing, the bandwidth may be divided into four 20 MHz segments 308, 310, 312, and 314 (e.g., channels), as illustrated in FIG. 3. The AP 304A may be associated with segment 308, the AP 304B may be associated with segment 310, the AP 304C may be associated with segment 312, and the AP 304D may be associated with segment 314.

In an embodiment, when the APs 304A-D and the STAs that are in a state or condition such that the STAs can communicate concurrently with other devices (e.g., STAs near the center of the BSA) are communicating with each other, then each AP 304A-D and each of these STAs may communicate using a portion of or the entire 80 MHz medium. However, when the APs 304A-D and the STAs that are in a state or condition such that the STAs cannot communicate concurrently with other devices (e.g., STAs near the edge of the BSA) are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. Because the segments 308, 310, 312, and 314 are different portions of the communication medium, a first transmission using a first segment would not interference with a second transmission using a second segment.

Thus, APs and/or STAs that include the high-efficiency wireless component can be placed on orthogonal frequency bands so that they can communicate concurrently with other APs and STAs without interference. This may occur even for those devices that are in an initial state or condition such that they cannot communicate concurrently with other devices. Accordingly, the throughput of the wireless communication system 300 may be increased. In the case of apartment buildings or densely-populated public spaces, APs and/or STAs that use the high-efficiency wireless component may experience reduced latency and increased network throughput even as the number of active wireless devices increases, thereby improving user experience.

Figure 4:
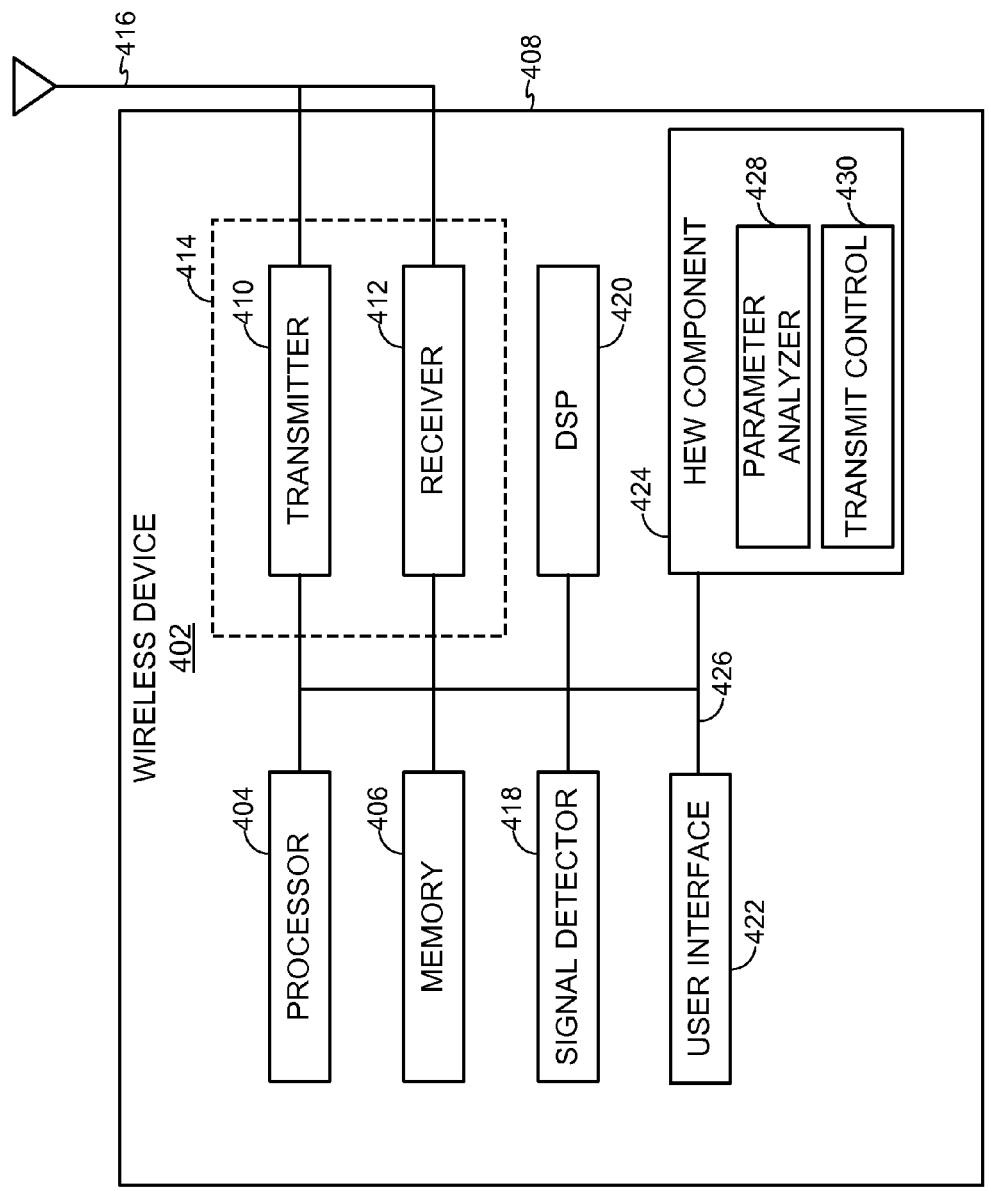
FIG. 4 shows a functional block diagram of an exemplary wireless device that may be employed within the wireless communication systems of FIGS. 1, and 2B.

FIG. 4 shows an exemplary functional block diagram of a wireless device 402 that may be employed within the wireless communication systems 100, 250, and/or 300 of FIGS. 1, 2B, and 3. The wireless device 402 is an example of a device that may be configured to implement the various methods described herein. For example, the wireless device 402 may comprise the AP 104, one of the STAs 106, one of the APs 254, one of the STAs 256, and/or one of the APs 304.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The wireless devices 402 may further comprise a high-efficiency wireless component 424 in some aspects. The high-efficiency wireless component 424 may include a parameter analyzer 428 and a transmit control unit 430. As described herein, the high-efficiency wireless component 424 may enable APs and/or STAs to use a modified mechanism that minimizes the inefficiencies of the CSMA mechanism (e.g., enables concurrent communications over the medium in situations in which interference would not occur).

The modified mechanism may be implemented by the parameter analyzer unit 428 and the transmit control unit 430. In an embodiment, the parameter analyzer unit 428 determines parameters associated with a message received on a wireless medium and also may determine parameters associated with a message queued and ready for transmission by the device 402 on the wireless medium. The parameter analyzer may determine, based on the parameters, whether the message ready for transmission by the device 402 should be transmitted at least partially concurrently with another message being received on the wireless medium. In an embodiment, the transmit control unit 430 controls how the device 402 transmits on a wireless medium. For example, the transmit control unit 430 may determine whether to defer transmission of a message that is otherwise ready for transmission. The transmit control unit 430 may make this determination based on the determinations made by the parameter analyzer unit 428.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 4, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 4 may be implemented using a plurality of separate elements.

The wireless device 402 may comprise an AP 104, a STA 106, an AP 254, a STA 256, and/or an AP 304, and may be used to transmit and/or receive communications. That is, either AP 104, STA 106, AP 254, STA 256, or AP 304 may serve as transmitter or receiver devices. Certain aspects contemplate signal detector 418 being used by software running on memory 406 and processor 404 to detect the presence of a transmitter or receiver.

In another embodiment, devices that are in a state or condition such that they can communicate concurrently and may conditionally transmit a first wireless message during transmission of a second wireless message, with the second wireless message being transmitted by a different wireless device. In some aspects, the conditional transmission may be based on the second wireless message. In other aspects, the conditional transmission may be based on the first message. In still other aspects, the condition transmission may be based on attributes or indications of the first and the second messages. In still other aspects, the condition transmission may be further based on deferral rules provided by another wireless device. For example, in some aspects, an access point may indicate to one or more stations under what conditions they should defer transmissions and/or not defer transmissions.

Figure 5A:
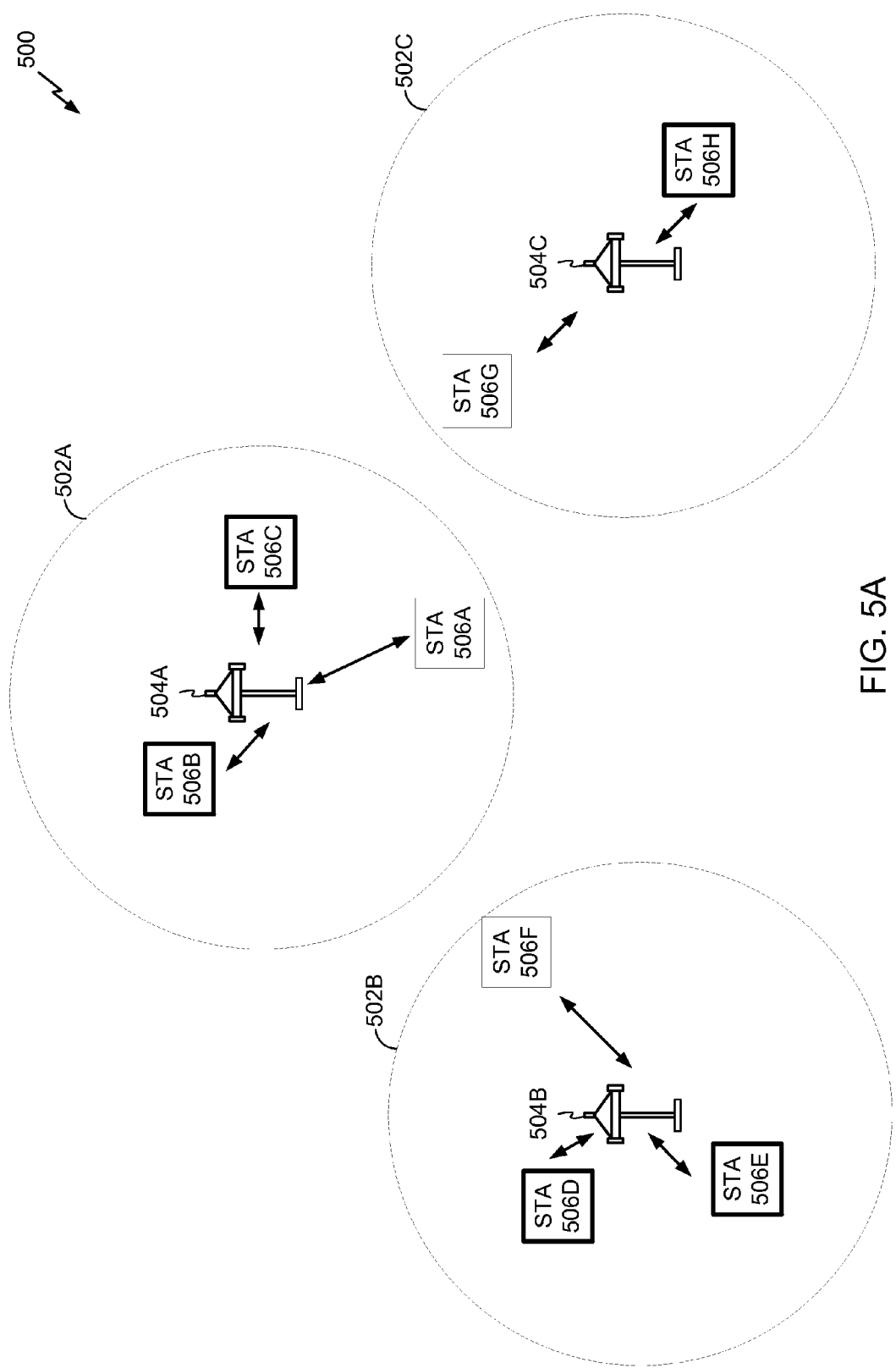
FIG. 5A shows examples of concurrent transmission that may be employed within the wireless communication systems 100 of FIG. 1 and 250 of FIG. 2B.

FIG. 5A shows examples of concurrent transmissions that may be employed within the wireless communication systems 100 of FIG. 1 and 250 of FIG. 2B. The concurrent communications shown in FIG. 5A may provide for improved reuse of a wireless medium shared by multiple wireless devices. This enhanced reuse or concurrency may result in an increase in the total or average throughput of the wireless medium.

FIG. 5A illustrates three access points 504A-C. Each access point 504A-C manages a corresponding basic service set (BSS) 502A-C. Each access point 504A-C is also in communication with a plurality of stations 506A-H. For example, access point 504A is in communication with stations 506A-C, while access point 504C is in communication with stations 506G-H. While FIG. 5A should not be considered strictly drawn to scale, the distances within the figure between the illustrated access points 504A-C and stations 506A-H should be considered representative. For example, for purposes of the discussion that follows, station 506E is physically closer to access point 504B than station 506F for example. Similarly, station 506A is physically closer to access point 504C than station 506B.

In some aspects, the physical location of a station relative to other stations, its associated access point, and/or other access points may make the station more or less subject to interference. For example, because stations 506D-E are positioned relatively close to their access point 504B and relatively far from both other BSS's 502A and 502C, as well as relatively distant from the access points 504A and 504C and the stations 506A-C and 506G-H communicating within those BSS's, stations 506D-E may be less susceptible to interference when either of those BSS's communicate. Similarly, STA 506H may be less susceptible to interference from transmissions generated by either BSS 502A or 502B.

While some wireless network standards, such as 80211ac may prevent access point 504B from communicating with STA 506E while access point 504A is communicating with STA 506B, in some of the disclosed embodiments, access point 504A may communicate with its stations concurrently with AP 504B's communication with its stations. Because these devices may not be susceptible to interference, some of the devices may communicate concurrently with other devices, even if a traditional carrier sense media access mechanism would prevent such concurrent transmission. In some aspects, stations may also be configured to communicate concurrently with other stations. For example, STA 506H may communicate with access point 504C concurrently with access point 504B communicating with stations 506D or 506E. By increasing the ability of one or more of the devices to communicate concurrently, a higher level of reuse of the shared wireless medium may be achieved. This may result in increased throughput of the wireless medium across the multiple devices.

Within BSSs 502A-C, some stations may be more susceptible to interference. For example, stations positioned relatively further from their associated access point and/or relatively closer to wireless devices communicating within other BSSs may be more susceptible to interference.

To provide for increased use of a wireless medium, in some aspects, access points 504A-C and/or stations 506A-H may indicate within a transmission whether that transmission is susceptible to interference. In one aspect, a transmitter may explicitly request in a wireless message that a wireless device receiving the wireless message defer its own transmissions until the transmission of the wireless message is complete. For example, when access point 504B transmits a message to STA 506F, it may request, via an indication in the transmitted message, that other devices defer their own transmissions while the message to STA 506F is being transmitted. This may prevent interfering transmissions from STAs 506D-E and also STA 506A from preventing STA 506F from receiving AP 504B's transmission, which may be transmitted across a substantial distance, resulting in a relatively poor signal to noise ratio when received by STA 506F. In contrast, in some aspects, when AP 504B transmits a message to STA 506D, the AP 504B may not request that other devices defer their own transmissions until the transmission of the message is completed. Deferral of transmissions may not be requested by AP 504B in this case because it is more likely that AP 504B's transmission to STA 506D can "burn through" other transmissions, because of a high quality signal path between STA 506D and AP 504B. This strong signal path may be the result of a relatively close proximity between AP 504B and STA 506D, or because of a relatively high transmit power of AP 504B, or the relative absence of potentially interfering sources along the signal path between AP 504B and STA 506D, or for potentially other reasons.

In some aspects, a first wireless device may defer its own transmissions during transmission by a second wireless device based on a type of third wireless device to which a particular first message is addressed. These aspects may operate under the assumption that certain types of devices may be more tolerant of interference during reception of the first message. Alternatively, in some networks, certain types of devices may be less likely to be within a proximity of the first wireless device, such that transmissions by the first wireless device will potentially interfere with reception of the first message by the third wireless device.

For example, in some aspects, if the destination device of the first message is a station, the first wireless device receiving the message may defer its own transmissions while the first message is being transmitted. In contrast, in some of these aspects, if the destination device of the first message is an access point, the first wireless device may initiate transmission of a second message while the first message is being transmitted. These aspects may operate under the assumption that access points can generally tolerate a higher level of interference than stations during reception of messages. This may be the case in some aspects, as some access points may be provided with some sophisticated and more expensive receiver technology than some stations, which may be most cost sensitive.

In some other aspects, if the destination of the first received message is an access point, the wireless device may defer its own transmissions. In these aspects, if the destination of the message being received is a station, the wireless device may transmit its own message concurrently with the received message. These aspects may operate under the assumption that since access points generally have a higher transmit power than stations, messages transmitted by access points to stations may be more likely to "burn through" other transmissions, due to their relatively higher signal to noise ratio. However, these aspects may assume that messages transmitted to access points from stations, may be transmitted at a relatively lower power level, and are thus more susceptible to interference from concurrent transmissions.

In some aspects, the originating BSS of the first message may be considered when determining whether to defer a transmission. In some aspects, if a first message originates from the same BSS with which a receiving device is associated, the receiving device may defer transmission of a second message until transmission of the first message is complete. Similarly, if the first message originates from a BSS different from the one with which a receiving device is associated, transmission of the second message may not be deferred during transmission of the first message.

For example, if STA 506F receives at least a portion of a message from BSS 502A, in some aspects it may determine to not defer its own transmission to access point 504B. If STA 506F receives at least a portion of a message from STA 506D, which is within the same BSS as STA 506F, then in some aspects, STA 506F may determine to defer its own transmissions until the transmission from STA 506D has been completed. This may ensure AP 504B is able to successfully receive STA 506D's transmission, while still enabling STA 506F and STA 506C to transmit concurrently, for example.

In some aspects, whether a wireless device defers transmission of a message may be based on attributes of the message itself. For example, in some aspects, messages transmitted to a destination device within a relatively close proximity of the source or transmitting device may not be deferred based on reception, by the transmitting device, or another message.

In some aspects, whether a wireless device defers transmission of a message may be based on the type of the wireless device. These aspects may operate under the assumption that the type of transmitting device indicates a probability of whether the transmission is likely to cause harmful interference or not. For example, in some aspects, an access point may not defer its own transmissions. In some aspects, an access point's deferral strategy may be different than it's associated stations deferral strategy. For example, an access point may never defer its own transmissions, while a station associated with the access point may defer its own transmissions upon receiving a portion of a message transmitted by the access point, but may not defer its own transmissions when receiving a portion of a message transmitted by a different access point (in a different BSS).

Figure 5B:
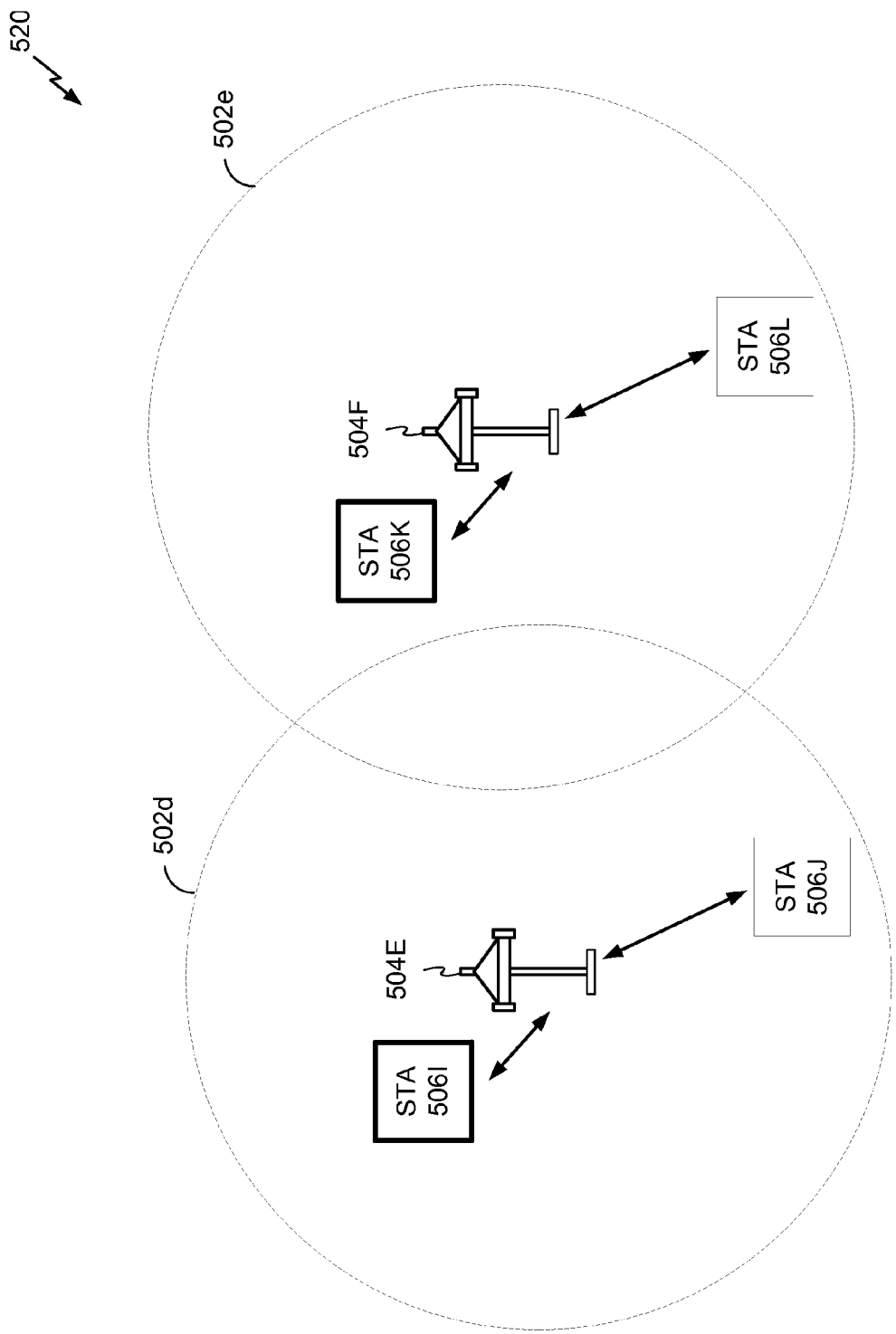
FIG. 5B illustrates two access points utilizing a standard energy deferral threshold.

FIG. 5B illustrates two access points that utilize a standard energy deferral threshold. AP 504E is controlling BSS 502*d*, while AP 504F is controlling BSS 502*e*. Access points 504E-F may implement energy deferral thresholds in substantial accordance with the thresholds defined by the 802.11ac standard. AP 504E is controlling BSS 502*d*, while AP 504F is controlling BSS 502*e*.

In some implementations, energy received from a wireless medium may be effectively ignored by APs E-F if the energy's magnitude is below a standard energy deferral threshold. In this way, either of APs E-F may determine the media is available if energy on the medium is below the standard energy deferral threshold, and transmit its own data concurrently with other data on the media that is again below the standard energy deferral threshold. For example, in 802.11 AC, devices such as APs E-F may utilize an energy deferral threshold of −62 dBM or −72 dBm under various circumstances.

With the use of some standard energy deferral thresholds, for example, again those of 802.11ac, the two AP's 504E-F may not transmit concurrently. For example, a transmission of AP 504E to STA 506I may be received by AP 504F at an energy level above AP 504F's standard energy deferral threshold. Because a transmission by AP 504E is above AP 504F's standard energy deferral threshold, AP 504F detects AP 504E's transmission and implements a standard transmission deferral method before reattempting to transmit on the wireless network. Similarly, transmissions by AP 506F to STA 506*k* may be received by AP 504E at an energy level above AP 504E's standard energy deferral threshold. AP 504E may therefore detect that the media is in use when AP 504F is transmitting, and defer its own transmissions until at least the transmission of AP 405F is complete.

Figure 5C:
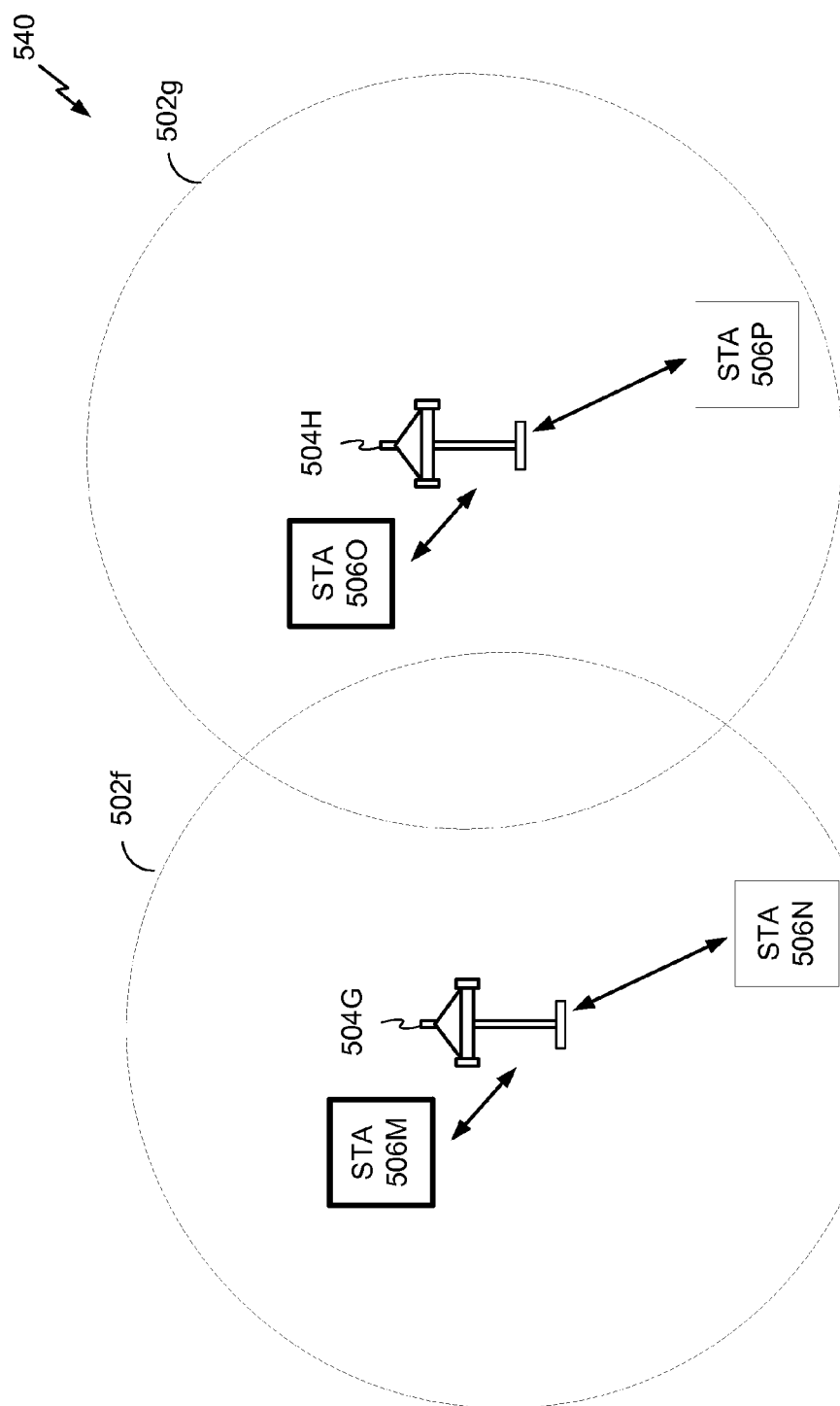
FIG. 5C shows examples of concurrent transmissions that may be employed within the wireless communication systems 100 of FIG. 1 and 250 of FIG. 2B.

FIG. 5C shows examples of concurrent transmissions that may be employed within the wireless communication systems 100 of FIG. 1 and 250 of FIG. 2B. FIG. 5C illustrates two access points 504G-H. Access points 504G-H may substantially incorporate features of AP HEWC 154, shown in FIG. 1, and/or AP w/HEWC 254A-C shown in FIG. 2B. The access points 504G-H may be implemented by the wireless device 402 in some aspects. AP 504G is controlling BSS 502*f*, while AP 504H is controlling BSS 502*g*. The concurrent transmissions demonstrated in FIG. 5C may provide for increased reuse of a wireless medium.

In some aspects, concurrent transmissions may be achieved through the use of a higher energy deferral threshold than the standard energy deferral threshold utilized in FIG. 5B by access points 504E-F. By increasing the energy deferral threshold, greater transmission concurrency may be achieved between one or more devices utilizing the increased energy deferral threshold and other devices transmitting on the wireless network. For example, while a standard energy deferral threshold in 802.11ac may be set to −72 dBm under particular conditions, the access points 504E-F may utilize an energy deferral threshold that is higher than −72 dBm. For example, in some aspects, the access points 504E-F may utilize an energy deferral threshold of −62 dBM when the 802.11 ac standard calls for an energy deferral threshold of −72 dBm.

Use of a higher standard energy deferral threshold may facilitate increase reuse of the wireless medium shared by AP's 504G-H as compared to the medium shared by AP's 504E-F. For example, in the illustrated aspect of FIG. 5C, AP 504G may transmit a wireless message to STA 506M. This message is also received by AP 504H at an energy level that is below AP 504H's increased energy deferral threshold. Note that the energy level of the message when received by AP 504H may be the same energy level received by AP 504F when AP 504E transmits. However, because AP 504H is utilizing an increased energy deferral threshold relative to AP 504F, AP 504H may determine that the media is still available when AP 504G is transmitting. As a result, AP 504H may transmit a message to STA 506P (for example) concurrently with a transmission from AP 504G to STA 506M or 506N (for example). Therefore, an increased energy deferral threshold may provide for an increased reuse (increased concurrency) of the wireless medium shared by APs G-H as compared to the medium shared by AP's 504E-F, which utilizes a standard energy deferral threshold. In the aspects discussed above, a preamble deferral threshold may be substituted for references to an energy deferral threshold.

In some aspects, a transmission rate of a preamble may be based on conditions of the wireless medium at the time the transmission is initiated. For example, in some aspects, a wireless device may detects that a transmission is occurring on a wireless medium, but determine not to defer to that transmission and instead initiate a second transmission. In some aspects, the preamble of the second transmission may be transmitted at a reduced rate relative to a standard or default transmission rate. Transmitting the preamble at the reduced rate may be based on the detection of the first transmission. By transmitting the second message preamble at a reduced rate may ensure robust deferral of third party stations and also ensure robust channel control. In some aspects, the threshold may be six megabits per second (Mbps).

Figure 5D:
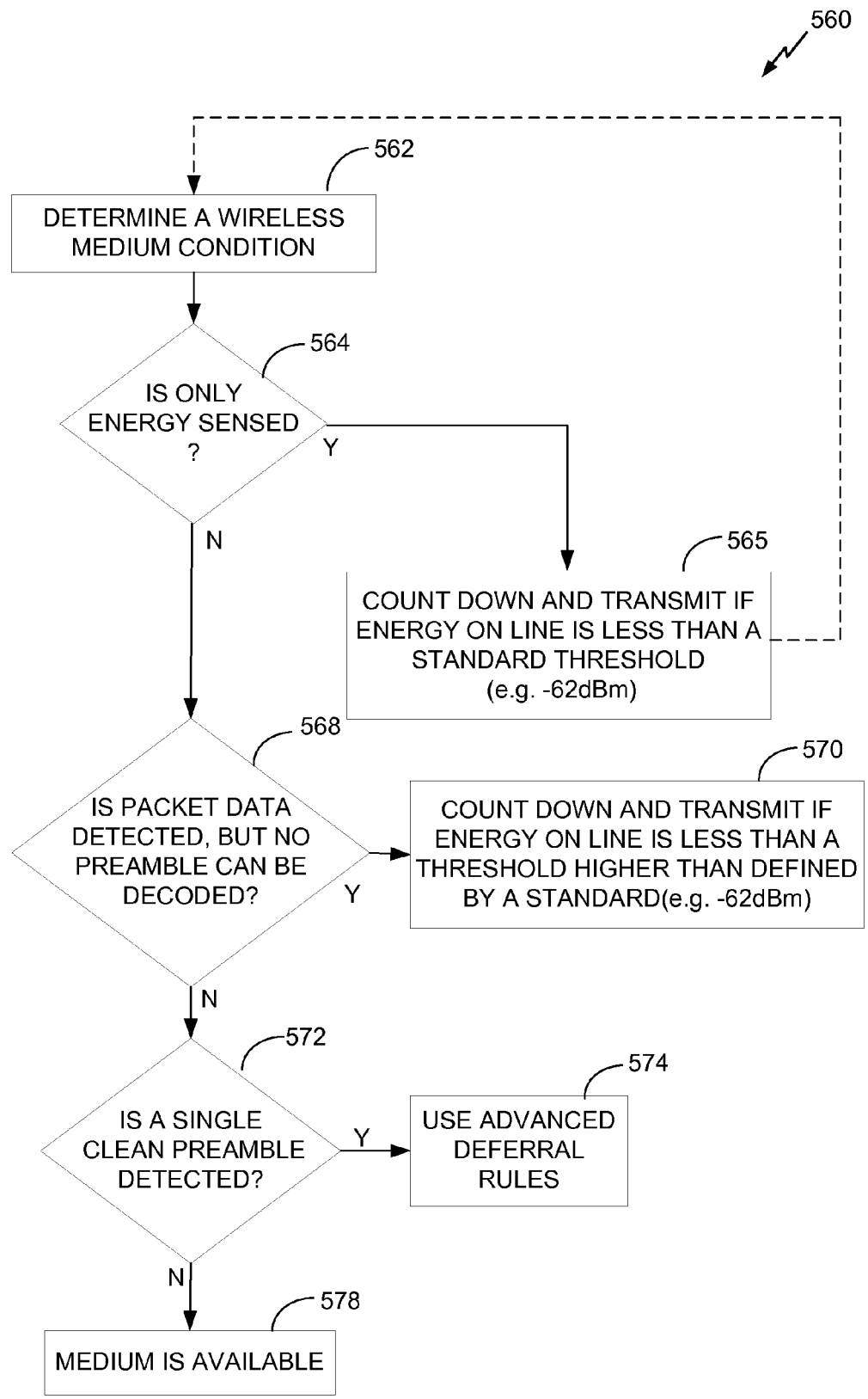
FIG. 5D is a flowchart of a process for transmitting a wireless message on a medium utilizing carrier sense multiple access (CSMA) that may be employed within the wireless communication systems 100 of FIG. 1 and 250 of FIG. 2B.

FIG. 5D is a flowchart of a process for transmitting a wireless message on a medium, utilizing carrier sense multiple access (CSMA) that may be employed within the wireless communication systems 100 of FIG. 1 and 250 of FIG. 2B. In some aspects, process 560 may be performed by an access point or a station. If performed by an access point, process 560 may increase downlink reuse, resulting in greater downlink throughput. If performed by a station, process 560 may increase uplink reuse, resulting in greater uplink throughput.

In block 562, the condition of a wireless medium is determined. For example, before a wireless device transmits on a wireless network, devices employing carrier sense media access (CSMA) may sense whether transmissions are currently occurring on the network. FIG. 5D contemplates at least three distinct wireless medium conditions: 1) only energy is detected (tested in decision block 564) 2) packet data is detected but no preamble is detected (tested in block 568) or a preamble is detected (tested in block 572).

Decision block 564 determines whether only energy is sensed on the medium. In some aspects, the energy sensed may be the result of noise or interference on the medium being greater than a threshold. If the energy is sensed but no packet data is detected, transmission of any pending messages is deferred. Process 560 moves to block 565, where a count down or substantially standard CSMA back-off method is performed. After a back-off or count down time has elapsed, a standard energy deferral threshold is utilized to determine whether the medium is available. In some aspects, after block 565 is performed, block 562 may be performed again using the specified threshold.

If packet data is detected, process 560 moves to decision block 568, which determines whether a packet preamble data is detected. In some aspects, sensing of a medium may not detect a preamble, but may detect packet data. Block 568 identifies whether this is the case. If no preamble is detected, process 560 moves from decision block 568 to block 570, where a standard CSMA back-off or countdown method may be employed. After the back-off time period has elapsed, process 560 may sense the media again using an energy deferral threshold higher than a threshold identified in a standard. For example, in some aspects, an energy deferral threshold of −62 dBm may be utilized when a standard (such as 802.11ac) calls for a threshold of −72 dBm to be utilized. Use of the increased energy deferral threshold relative to the standard threshold may enable a device performing process 560 to experience increased reuse and higher availability of a medium shared by other devices. For example, if process 560 is performed by a first access point, increased reuse may be experienced when the first access point is susceptible to interference from transmissions of a second access point.

If decision block 568 does not detect packet data or a preamble is detected, process 560 moves to decision block 572, which determines whether a valid preamble is detected. If a preamble is detected, process 560 moves to block 574, which utilizes advanced deferral rules as discussed below with respect to FIGS. 6C-8B. If no preamble is detected in block 572, the medium is determined to be available in block 578.

Figure 5E:
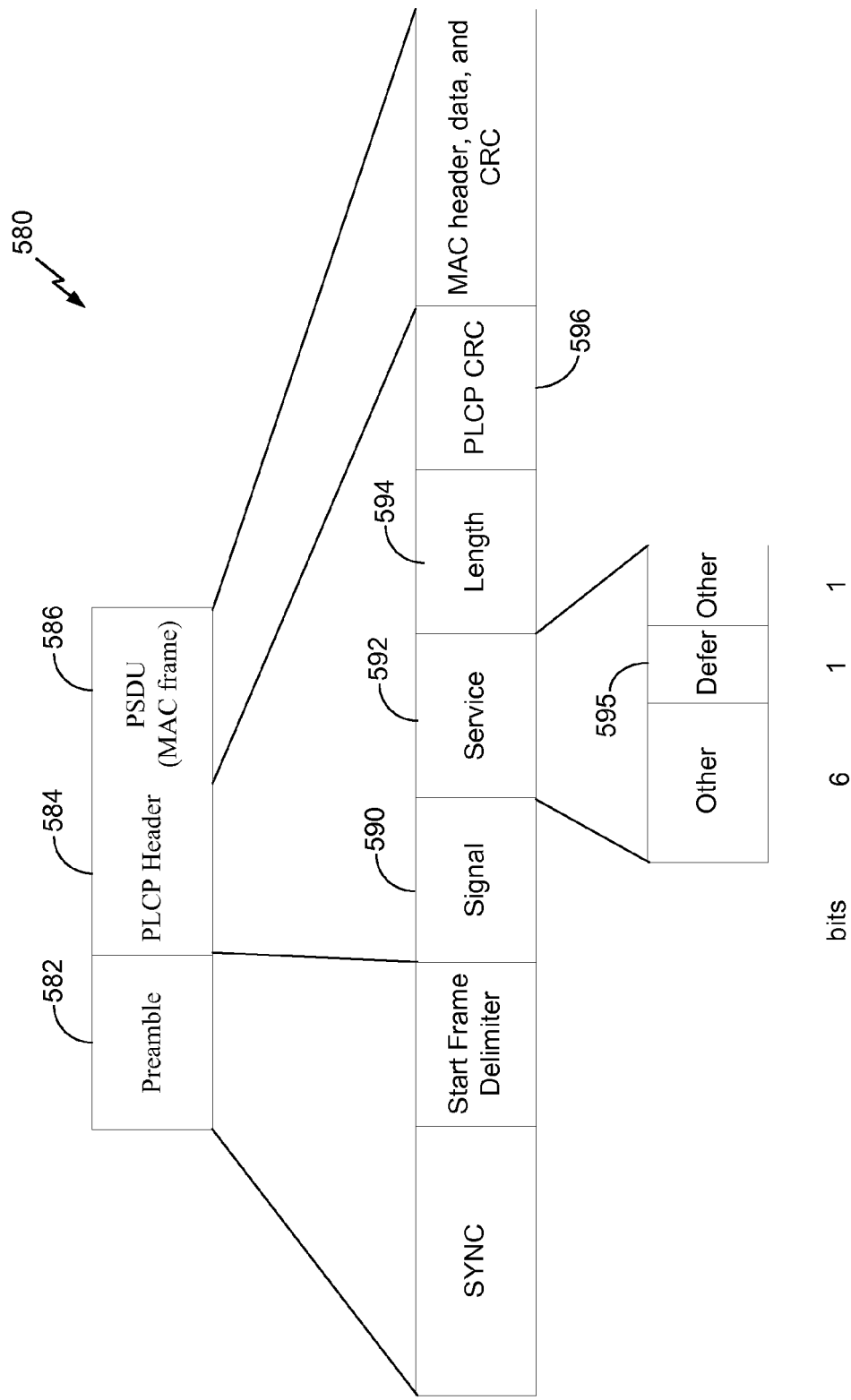
FIG. 5E illustrates an exemplary wireless network packet.

FIG. 5E illustrates an exemplary wireless network packet or message that may be transmitted within the communication system 100 of FIG. 1 and/or the communication system 250 of FIG. 2B, or communications system 540 of FIG. 5C. The wireless packet 580 includes a preamble 582, PLCP header 584, and a PSDU or MAC frame 586. The PLCP Header 584 includes a signal field 590, service field 592, length field 594, and PLCP CRC field 596. A defer field 595 is defined in the service field 592. In the illustrated example, the defer bit is bit 1 of the service field. However, other one or more bits within the service field 592 or other fields of the PLCP header 584 may be used as a defer indication in other aspects. In one implementation, a set defer indication indicates that the transmitter of the packet is requesting that other devices on the wireless medium defer their transmissions until after transmission of the wireless network packet 580 is complete. In some aspects, if the defer indication is clear, this indicates the transmitter of the packet 580 is not requesting deferral of other transmissions during the transmission of packet 580. In some implementations, the meanings of these bit values may be reversed.

In some aspects, a transmitting device may set the defer indication 595 based on one or more characteristics of a destination device for the wireless message 580. In some aspects, these characteristics may relate to a probability that the destination device will accurately receive and decode the message 580. In some aspects, a transmitting device may request deferral when transmitting to a destination wireless device that has been determined to be either subject to interference or located at a distance greater than a first threshold proximity from the transmitting device.

The transmitting device may not request deferral using the deferral indication 595 if a destination device is determined to not be generally subject to interference or if the destination device is within a first threshold proximity of the transmitter. This strategy may be based on the assumption that the destination station has a high likelihood of successful reception of the message 580, and can therefore tolerate some interference generated by a concurrent transmission.

If the transmitter does not request deferral, some other devices detecting the transmission of packet 580 on a wireless network may transmit their own packets concurrently with the transmission of packet/message 580. Therefore, by not requesting deferral, the transmitting device of packet 580 may provide for increased reuse of a wireless medium shared by multiple devices. This increased reuse may provide for an increased bandwidth of the wireless medium in some aspects. Further use of the defer bit 595 illustrated in FIG. 5E will become apparent after review of the disclosure that follows.

Figure 6A:
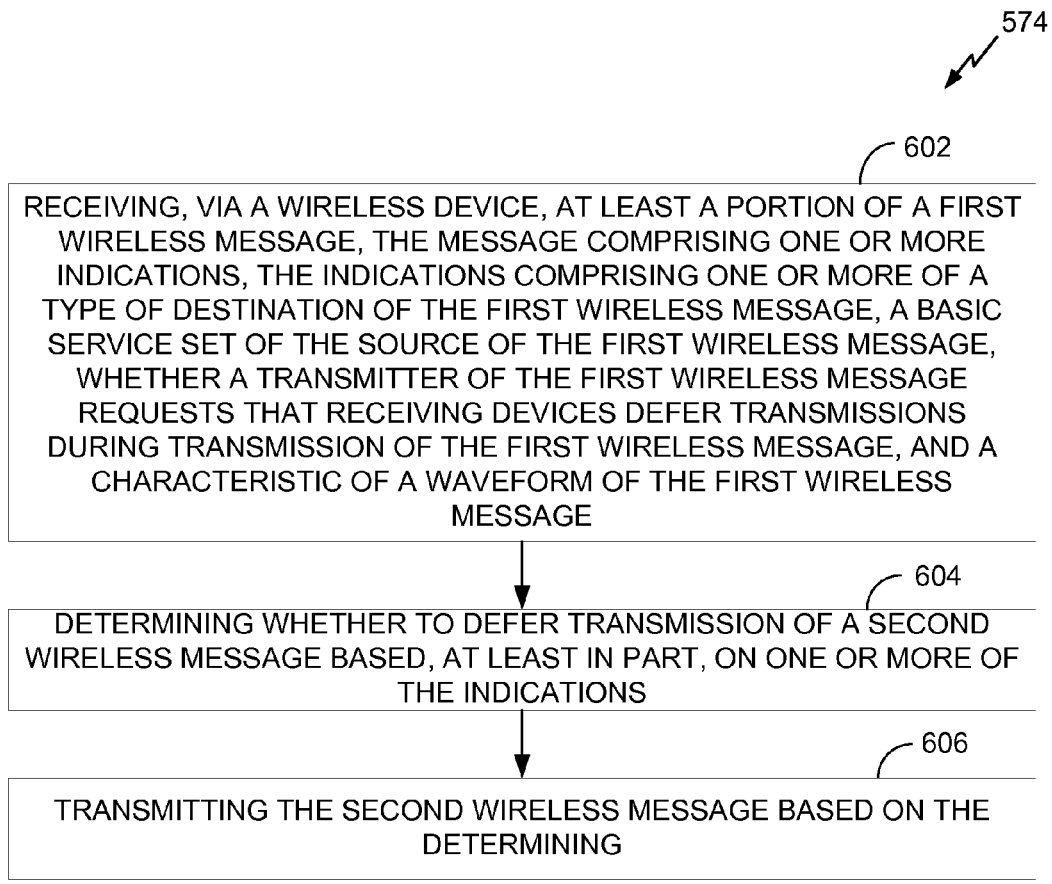
FIG. 6A is a flowchart of a process for transmitting a wireless message on a medium utilizing carrier sense multiple access (CSMA) that may be employed within the wireless communication systems 100 of FIG. 1 and 250 of FIG. 2B.

FIG. 6A is a flowchart of a process 574 for transmitting a wireless message on a medium utilizing carrier sense multiple access (CSMA) that may be employed within the wireless communication systems 100 of FIG. 1, 250 of FIG. 2B, or 540 of FIG. 5C. In some aspects, process 574 may be performed by an access point or a station. Process 574 of FIG. 6 may correspond and/or be utilized in block 574 of FIG. 5D in some aspects of method 560.

In block 602, at least a portion of a first wireless message is received via a wireless device. In some aspects, the received portion includes at least a preamble of the first wireless message. The first wireless message comprises one or more indications. The indications may include one or more of a type of destination of the first wireless message, a basic service set (BSS) of the source of the first wireless message, whether a transmitter of the first wireless message requests that receiving devices defer transmissions during transmission of the first wireless message, and an attribute of a waveform of the first wireless message. In some aspects, an attribute of a waveform may include the modulation or coding of the first wireless message. In some aspects, a type of destination indication in the received message portion may indicate whether a destination node for the message is an access point or a station. In some aspects, the basic service set of the source of the first wireless message may be located within a preamble of the first wireless message. In some aspects, the first wireless message may also include a power level a transmitter of the first wireless message used to transmit the message. In some aspects, the first wireless message may substantially conform with the format of the wireless message 580.

In some aspects, a transmitter of the received message may request deferral when transmitting to a wireless device with marginal or compromised reception attributes. For example, if a substantial distance exists between the transmitter and an intended receiver, for example, a distance larger than a threshold, the transmitter may request deferral. Similarly, if an intended receiver is relatively close to the transmitter, the transmitter may not request deferral, assuming its transmission can burn through any other simultaneous transmissions due to its close proximity to the intended receiver.

Block 604 determines whether to defer transmission of a second wireless message based, at least in part, on one or more of the indications. Some aspects utilize the source BSS indication of the received message portion above to determine whether a medium should be reused during transmission of the received message. For example, in some aspects, a transmitter may determine not to reuse a medium (i.e. determine to defer to the received first wireless message) if it detects the first wireless message originated from within its own BSS. If the first wireless message originated from a different BSS, the block 604 may, in some aspects, determine not to defer transmission of the second wireless message, and to instead transmit the second wireless message concurrently with the transmission/reception of the first wireless message from the different BSS.

These aspects may operate under an assumption that transmissions within a "local" BSS may be to relatively nearby devices, and thus reuse of the medium during these transmissions may reduce overall network throughput. These aspects may reuse the medium when transmissions from other BSSs are detected. Therefore, in these aspects, if the source BSS of the first wireless message is different than the BSS ID of the wireless device receiving the first wireless message, then transmission may not be deferred. These aspects may provide for improvements in concurrent communication or reuse between wireless devices communicating with different access points.

In one aspect, the type of destination indication received in the first wireless message portion of block 602 may be utilized to increase reuse of a medium. For example, in some aspects, if the received message is destined for an access point, some implementations may determine not to defer transmission of the second wireless message during transmission of the received first wireless message. These implementations may provide for more reuse during transmissions to an access point because these transmissions may be typically generated by devices with less transmit power available than is typically available from an access point. Alternatively, some implementations may defer to message transmissions to an access point, even if the source of the transmission is in a different BSS than the device transmitting the second wireless message. This may ensure weaker transmissions from stations in neighboring BSSs are not unduly interfered with.

In some aspects, a transmitter of the first wireless message requests that receiving devices defer transmissions during transmission of the first wireless message. For example, the first wireless message may substantially include the defer indication 595 illustrated in FIG. 5E. In these aspects, transmission of the second message may be deferred based on the defer indication 595. In some aspects, the defer indication 595 is only one consideration in the deferral determination of block 604. For example, some devices may reuse the wireless medium (not defer to the reception/transmission of the first wireless message) even if the transmitter did request deferral. For example, in some aspects, the deferral decision for the second wireless message may be based on the defer indication and the source BSS. In some aspects, if the first wireless message indicates deferral is requested, and the originating/source BSS is the same as the receiving device's BSS, then the transmission of the second wireless message will be deferred during transmission/reception of the first wireless message. In these aspects, transmission of the second wireless message may not be deferred if deferral is requested and the source BSS is different than a receiving device's BSS.

In some aspects, the determining of whether to defer is further based on at least an indication of transmission deferral rules received from an access point. For example, in some aspects, an access point may indicate to its associated stations which if any of the indications discussed above should be used by stations to determine whether to defer transmission of a wireless message. In some aspects, the deferral rules may describe multiple conditions controlling message deferral determinations. The multiple conditions may be based on one or more of the indications provided above, and/or on additional indications or parameters.

In some aspects, the determining of whether to defer is further based on a type of the wireless device making the decision of whether to defer a transmission (i.e. a device performing process 574). For example, some access points may generally not defer their own transmissions. In these aspects, if the type of the wireless device is an access point, the transmission of the second wireless message may not be deferred, and any deferral indications present in the received first wireless message, such as deferral indication 595, may be ignored. These aspects may provide for improved downlink reuse in network environments including multiple access points.

In some aspects, stations may generally not defer their own transmissions. These aspects may be designed with the assumption that station transmissions are generally weaker, and less likely to interfere with the transmission of other devices. In these aspects, the second wireless message may not be deferred if the wireless device performing process 574 is a station. These aspects may provide for improved uplink reuse for data from a station to an access point. In some aspects, the determination of whether to defer transmission of the second wireless message may be based on a transmit power used when transmitting the second wireless message. For example, in some aspects, a transmitter may determine that the transmission of the second wireless message must be performed at a high power level in order for the transmission to be successfully received by an intended recipient of the second wireless message. The transmitter may also determine that this high power level will likely interfere with reception of the first wireless message at its intended recipient. As a result, the transmitter (device performing process 574) may decide to defer transmission of the second wireless message. Similarly, if the second wireless message can be transmitted at a relatively lower power level (for example, a power level below a lower power threshold), then the transmitter may determine such a low power transmission may likely not interfere with reception of the first wireless message at the intended recipient. Therefore, the transmitter may decide to not defer to the first wireless message, and transmit the second wireless message while the first wireless message is still being transmitted/received on the wireless network.

In some aspects, a station may be more likely to interfere with another BSS than an access point, since a station is more likely to be within an interference range of a different BSS's access point than its own associated access point. Therefore, in some aspects, stations may be configured to defer more often to messages received from different BSSs than from associated access points within the same BSS.

In some aspects, the determining of whether to defer transmission of the second wireless message in block 604 may be further based on a transmit power or a received power of the first wireless message. In some aspects, the transmit power may be indicated in a portion of the received first message. In some aspects, the transmit power of the first wireless message may be indicated in a preamble of the received first wireless message. In some aspects, the determining may be further based on an MCS of the received first wireless message.

In some aspects, block 604 may incorporate one or more of the functions discussed below with respect to block 804 of FIG. 8A. For example, a deferral determination may be based on properties or indications of a received message, as discussed above and/or also based on properties or indications of a transmitted message (which may be transmitted concurrently with the received message), as discussed below with respect to FIG. 8A.

Some aspects of block 604 may make a deferral determination based on a combination of the indications discussed above. For example, in some aspects, transmission of the second wireless message may be deferred if the destination of the message is a station and the BSS of the source is different than the BSS of the wireless device receiving the first wireless message. In another example, transmission may be deferred by stations even if a transmitter of the received messages does not request deferral. In another example, stations may reuse a medium if a transmitter of the received message of block 602 does not request deferral and the received power of the transmission is below a threshold. If the received power of the transmission is above the threshold, the station may still defer transmissions regardless of whether a transmitter of the received message requested deferral. Table one below summarizes some possible combination of indications within a received message, and how one implementation may determine whether to defer a transmission based on those combinations. The table below is not intended to be an exhaustive list of combinations nor communicate the only way a particular combination of indications may be processed. FIG. 6C shows an additional example of how some of the indications may be combined in block 604 to determine whether a transmission will be deferred.

TABLE 1

| INDICATIONS OF RECEIVED PORTION OF FIRST WIRELESS MESSSAGE | | | | | | Xmitter |
|---|---|---|---|---|---|---|
| Xmitter Deferral Indication | Dest Type | Source BSS[1] | Xmit Power[2] | Recv Power[2] | Properties Xmitter Type | Defer? |
| Y | AP | S | Low | Low | AP | Y |
| Y | AP | D | High | High | AP | y |
| Y | STA | S | High | Low | AP | Y |
| N | STA | D | High | High | STA | Y |
| N | STA | S | Low | Low | STA | Y |
| N | AP | D | Low | Low | STA | N |

[1] a value of "S" for source BSS indicates the source BSS indicated in the received message portion is the same BSS as the BSS of a device receiving the first wireless message, or a device performing process 574. A value of "D" for the source BSS indicates the source BSS is different than the BSS of the device receiving the first wireless message portion.
[2] a value of "low" for Xmit power or Receive power indicates that the transmit power or receive power is below a first transmit power or receive power threshold. A value of "high" indicates that the transmit power or receive power is above a second transmit power or receive power threshold. In some aspects, the first transmit power threshold may be equivalent to the second transmit power threshold, but in some other aspects, the two power thresholds may be different. The receive power thresholds may be structured similarly.

In some aspects, whether to defer transmission of the second wireless message may be further based on one or more attributes of the second wireless message, as discussed below with respect to FIG. 8A, block 804. In some aspects, block 604 may incorporate one or more of the functions discussed below with respect to block 804.

In some aspects, whether to defer transmission of the second wireless message may be based on a received signal strength of the first wireless message and/or a path loss experienced by the first wireless message. For example, in some aspects, transmission of the second wireless message may not be deferred if the received signal strength of the first wireless message is below a threshold, and the source BSS of the first wireless message is different than the BSS of a device performing process 600.

In some other aspects, a path loss of the first wireless message may be determined in block 604. For example, the path loss may be determined based on a transmit power of the first wireless message, which may be included in the first wireless message itself, minus a received signal strength of the first wireless message. Other aspects may assume a default transmission power when determining a path loss if a transmit power is not specified in the received message. In some aspects, if the path loss is below a threshold (or equal to in some aspects), transmission of the second wireless message will not be deferred until reception of the first wireless message is complete. Similarly, non-deferral may not be precluded if the path loss is above (or equal to in some other aspects) the threshold in these aspects (however, other conditions may be necessary before a transmission is not deferred, such as any combination of those discussed above, for example, that the BSS's may be different between source and receiving devices when not deferring to a received message).

Block 606 transmits the second wireless message based on the determination of block 604.

Figure 6B:
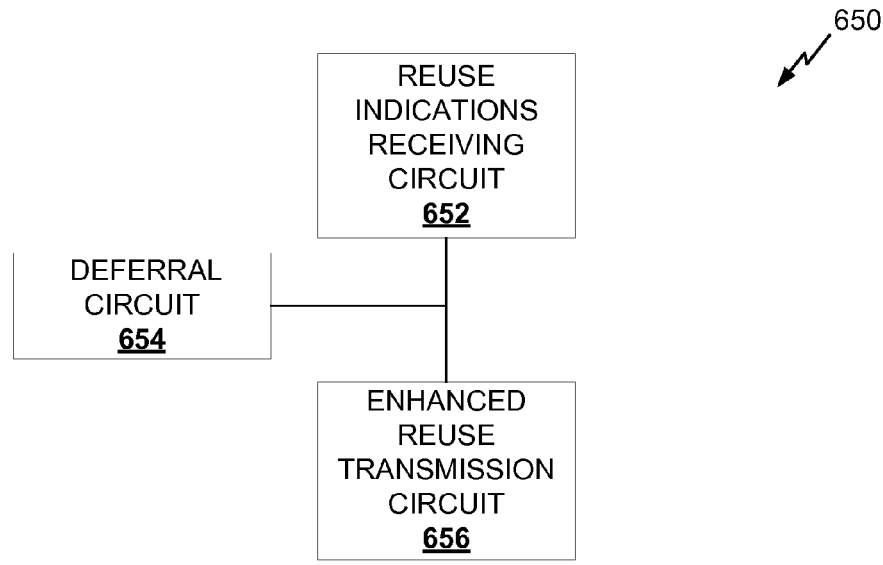
FIG. 6B is a functional block diagram of a wireless communication apparatus that may be employed within the wireless communication systems of FIGS. 1, and 2B.
Figure 6C:
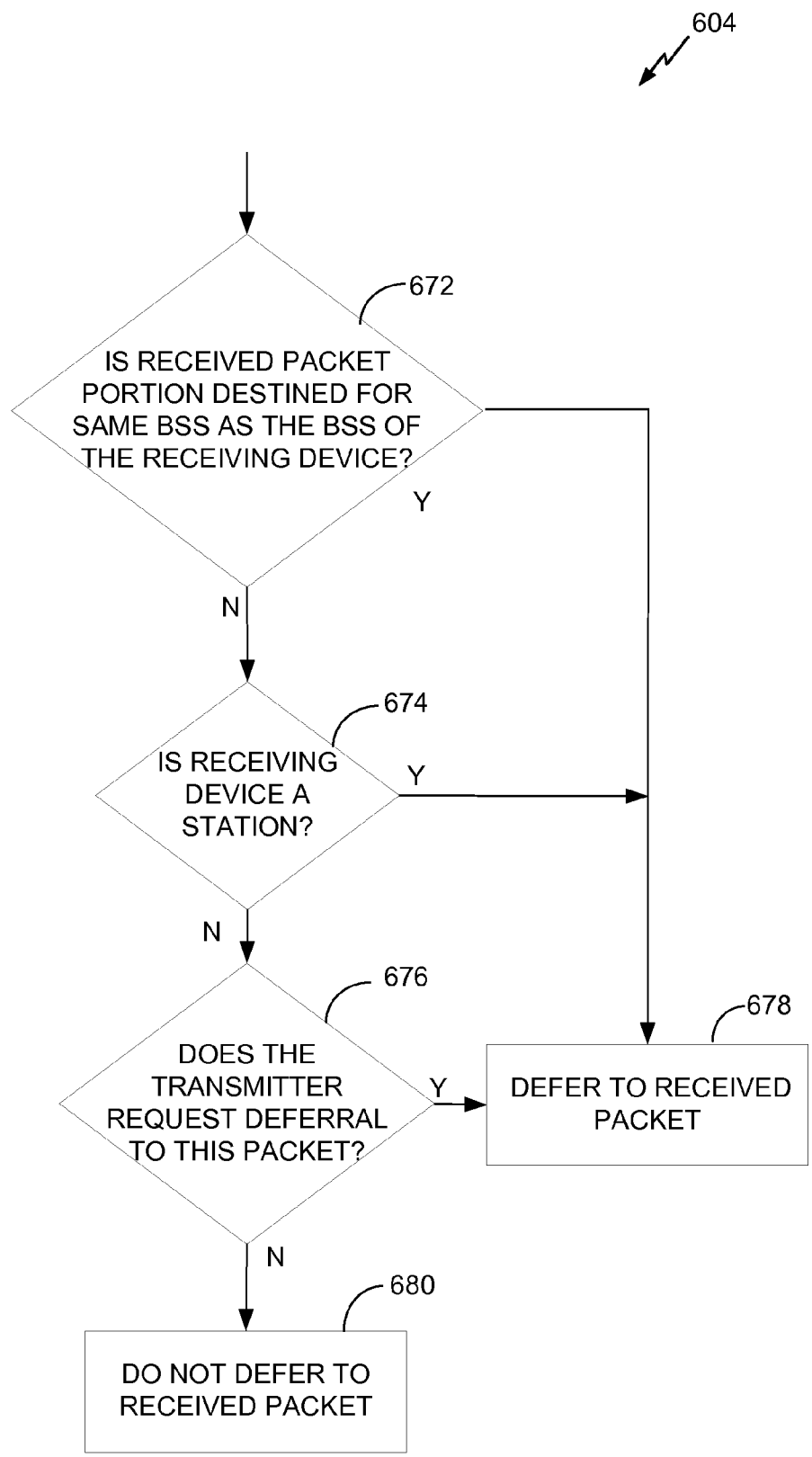
FIG. 6C is a flowchart of a process for determining whether to defer transmission of a wireless message on a medium utilizing carrier sense multiple access (CSMA) that may be employed within the wireless communication systems 100 of FIG. 1 and 250 of FIG. 2B.

FIG. 6B is a functional block diagram of a wireless communication apparatus 650 that may be employed within the wireless communication systems of FIG. 1, 2B, 3, or 5C. Those skilled in the art will appreciate that a wireless communication apparatus may have more components than the simplified wireless communication apparatus 650 shown in FIG. 6B. The wireless communication apparatus 650 shown includes only those components useful for describing some prominent features of implementations within the scope of the claims. The wireless communication apparatus 650 may include a reuse indications receiving circuit 652, deferral circuit 654, and an enhanced reuse transmission circuit 656. In some aspects, one or more of the reuse indications receiving circuit 652, deferral circuit 654, and enhanced reuse transmission circuit 656 may be implemented within one or more of the AP HEWC 154 or the STA HEWC 156 discussed above.

In some implementations, the reuse indications receiving circuit 652 may be configured to perform one or more of the functions discussed above with respect to block 602. The reuse indications receiving circuit 652 may include one or more of a programmable chip, a processor, a memory, and a network interface. For example, the reuse indications receiving circuit 652 may include the receiver 412. In some implementations, a means for receiving at least a portion of a first wireless message may include the reuse indications receiving circuit 652.

In some implementations, the deferral circuit 654 may be configured to perform one or more functions discussed above with respect to block 604. The deferral circuit 654 may include one or more of a programmable chip, a processor, a memory, and a network interface. For example, the deferral circuit may include the processor 404. In some implementations, a means for determining whether to defer transmission of a wireless message may include the deferral circuit 654.

In some implementations, the enhanced reuse transmission circuit 656 may be configured to perform one or more functions discussed above with respect to block 606. The enhanced reuse transmission circuit 656 may include one or more of a programmable chip, a processor, a memory, and a network interface. For example, the enhanced reuse transmission circuit may include the transmitter 410. In some implementations, a means for transmitting a wireless message based on a deferral determination may include the enhanced reuse transmission circuit 656. In some aspects, wireless apparatus 650 may incorporate one or more aspects of device 850, discussed below.

FIG. 6C is a flowchart of one aspect of a process for determining whether to defer transmission of a wireless message on a medium utilizing carrier sense multiple access (CSMA) that may be employed within the wireless communication systems 100 of FIG. 1, 250 of FIG. 2B, or 540 of FIG. 5C. In some aspects, process 604 may be performed by an access point or a station. Process 604 may be performed as part of process 600, discussed above with respect to FIG. 6A. For example, process 604 may be performed as part of block 604 of process 600 in some aspects. For example, the received packet referred to in FIG. 6C may be the first wireless message of process 574.

Decision block 672 determines if a received packet is destined for the same BSS as the BSS of a receiving device. The receiving device is not necessarily the device specified in a destination address of the received packet. Instead, the receiving device may be any device performing process 604. This may include any device within a transmission range such that the energy of the received packet/message is high enough to cause the receiving device to detect and decode the message. As discussed above, some aspects may choose to not transmit concurrently with other transmissions within the same BSS. If the received packet/message is destined for the same BSS, process 604 moves to block 678, which defers to the received packet.

Otherwise, decision block 674 determines whether the receiving device is a station. If the receiving device is a station, then process 604 moves to block 678, which defers to the received packet. If the receiving device is not a station (and may be an access point or a relay in some implementations), then block 676 determines whether a transmitter of the received packet is requesting that other receiving devices defer transmissions while the received packet is being transmitted. If deferral; is not explicitly requested by the transmitter, block 680 does not defer to the received packet. In other words, block 680 may determine that a transmission (such as the second wireless message in process 574 of FIG. 6A) may occur concurrently with transmission/reception of the received packet (first wireless message of FIG. 6A). This may facilitate increased reuse of a medium shared by multiple wireless devices. This increased reuse may provide for increased throughput of the wireless network when compared to known or standard methods.

Figure 7A:
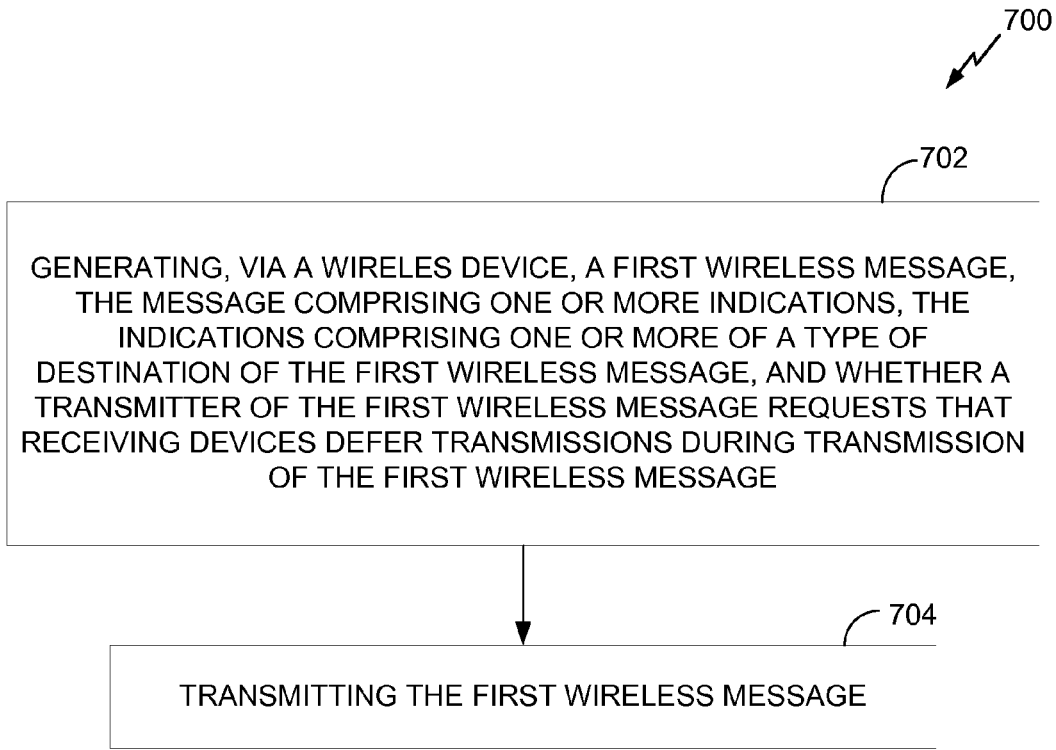
FIG. 7A is a flowchart of a process for transmitting a wireless message on a medium utilizing carrier sense multiple access (CSMA) that may be employed within the wireless communication systems 100 of FIG. 1 and 250 of FIG. 2B.

FIG. 7A is a flowchart of a process for transmitting a wireless message on a medium utilizing carrier sense multiple access (CSMA) that may be employed within the wireless communication systems 100 of FIG. 1, 250 of FIG. 2B, and 540 of FIG. 5C. In some aspects, process 700 may be performed by an access point or a station. In some aspects, the first wireless message transmitted in process 700 may provide one or more indications to devices receiving the message. The indication(s) may be utilized by the receiving devices to determine whether their own transmissions should be deferred until at least the transmission of the first wireless message is complete, or if they may initiate transmission of their own messages concurrent with the transmission of the first wireless message of process 700. In some aspects, concurrent transmission may provide for improved reuse of a wireless medium that is shared by multiple wireless devices. For example, a wireless medium shared by multiple access points within a relatively combined space, such as an apartment building or office park, may experience improved reuse of their wireless medium via the transmission of the first wireless message in process 700. This increased reuse may provide for increased throughput of wireless networks located within these dense network environments.

In block 702, a first wireless message is generated by a wireless device. The first wireless message comprises one or more indications. The indications comprise one or more of a type of destination of the first wireless message, and whether a transmitter of the first wireless message requests that receiving devices of the first wireless message defer transmissions during transmission/reception of the first wireless message (a defer request indication). In some aspects, a type of destination of the first wireless message may be an access point or a station.

In some aspects, the first wireless message may include additional indications. For example, the first wireless message may include an indication of a basic service set of the source of the first wireless message, and/or and an attribute of a waveform of the first wireless message. In some aspects, an attribute of a waveform may include the modulation or coding of the first wireless message.

In some aspects, a basic service set of the source of the first wireless message may be a basic service set identifier (BSSID) of a transmitter of the first wireless message, or in the case of process 700, the basic service set identifier of the wireless device.

In some aspects, the first wireless device may generate the defer request indication based on an assessed probability that the addressed receiver will accurately and completely receive the first wireless message. For example, in scenarios where the signal path between the wireless device and the addressed receiver is marginal, the wireless device may request deferral to maximize the changes that the first wireless message is received accurately and completely by the addressed receiver. This may be the case, for example, if a substantial distance exists between the transmitter and an intended/addressed receiver. Similarly, if the first message will be transmitted to a device that is in relative close proximity to the transmitter, the transmitter may not request deferral, because the probability is higher that the addressed receiver can accurately and completely receive the first wireless message, even if another device transmits during transmission/reception of the first wireless message. Because the transmitter is relatively close to the intended/addressed receiver, the transmitter's transmission may be able to burn through any other concurrent transmissions, resulting in an acceptable signal to noise ratio when the first message is received by the intended receiver. As other wireless devices may transmit concurrently with the transmission of the first wireless message when deferral is not explicitly requested, increased reuse of the wireless medium may result, along with an increase in the throughput of the wireless network when compared to known or standard methods.

In some aspects, the first wireless message further indicates the transmit power used to transmit the first wireless message. In some aspects, devices receiving the first wireless message may determine whether to defer their own transmissions until the end of the transmission/reception of the first wireless message based on the transmit power. For example, in some aspects, a high transmit power may indicate a marginal signal path between a transmitter and addressed receiver of the first wireless message. Therefore, some receiving devices in some aspects may defer to messages transmitted with a transmit power above a particular power threshold. Some other aspects may assume that a message transmitted with a low transmit power may be transmitted by a device with marginal or at least lower power transmission capabilities, such as a mobile station. When the transmit power indicated in a received message is relatively low, some aspects may defer their own transmissions until the transmission/reception of the received message is complete.

In block 704, the first wireless message is transmitted.

Figure 7B:
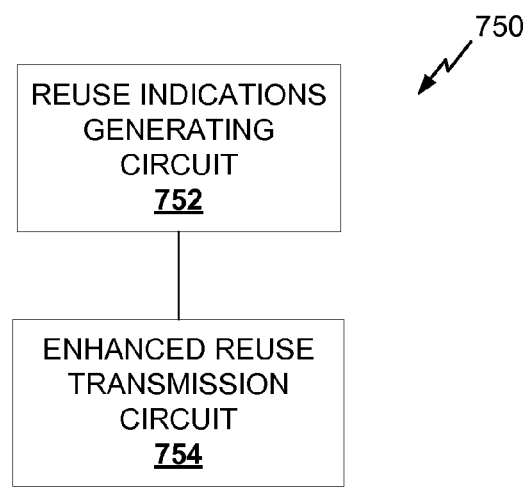
FIG. 7B is a functional block diagram of a wireless communication apparatus that may be employed within the wireless communication systems of FIGS. 1, and 2B.

FIG. 7B is a functional block diagram of a wireless communication apparatus that may be employed within the wireless communication systems of FIGS. 1, 2B, 3, and 5C. Those skilled in the art will appreciate that a wireless communication apparatus may have more components than the simplified wireless communication apparatus 750 shown in FIG. 7B. The wireless communication apparatus 750 shown includes only those components useful for describing some prominent features of implementations within the scope of the claims. The wireless communication apparatus 750 may include a reuse indications generating circuit 752 and an enhanced reuse transmission circuit 754. In some aspects, one or more of the reuse indications generating circuit 752, and enhanced reuse transmission circuit 754 may be implemented within one or more of the AP HEWC 154 or the STA HEWC 156 discussed above.

In some implementations, the reuse indications generating circuit 752 may be configured to perform one or more of the functions discussed above with respect to block 702. The reuse indications generating circuit 752 may include one or more of a programmable chip, a processor, a memory, and a network interface. For example, the generating circuit may include the processor 404. In some implementations, a means for generating a wireless message may include the reuse indications generating circuit 752.

In some implementations, the enhanced reuse transmission circuit 754 may be configured to perform one or more functions discussed above with respect to block 704. The enhanced reuse transmission circuit 754 may include one or more of a programmable chip, a processor, a memory, and a network interface. For example, the enhanced reuse transmission circuit may include the transmitter 410. In some implementations, a means for transmitting a wireless message based on a deferral determination may include the enhanced reuse transmission circuit 754.

Figure 8A:
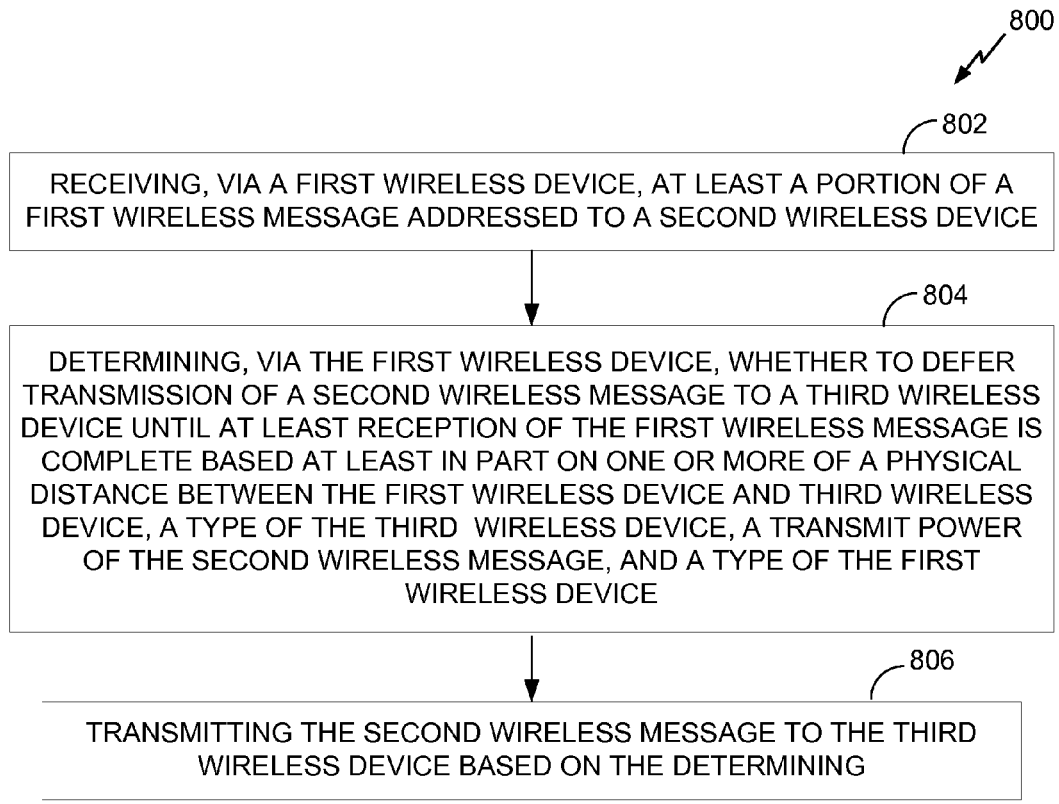
FIG. 8A is a flowchart of a process for transmitting a wireless message on a medium utilizing carrier sense multiple access (CSMA) that may be employed within the wireless communication systems 100 of FIG. 1 and 250 of FIG. 2B.

FIG. 8A is a flowchart of a process for transmitting a wireless message on a medium utilizing carrier sense multiple access (CSMA) that may be employed within the wireless communication systems 100 of FIG. 1, 250 of FIG. 2B, and/or 540 of FIG. 5C. In some aspects, process 800 may be performed by an access point or a station.

In block 802, at least a portion of a first wireless message is received by a first wireless device. In some aspects, the portion may include a preamble of the first wireless message. The first wireless message is addressed to a second wireless device. Note that although the intended receiver of the first wireless message is the second wireless device, the first wireless device may also receive the first wireless message. For example, devices listening on a wireless medium may receive at least portions of all or most messages transmitted on the medium. As the messages are received, their preambles may be decoded at least to the point of determining whether the message is addressed to the decoding device, and whether further processing is necessary or whether the remaining portion of the message may be discarded and/or ignored.

Block 804 determines whether to defer transmission by the first wireless device of a second wireless message to a third wireless device until at least reception of the first wireless message is complete based at least in part on one or more of a physical distance between the first wireless device and the third wireless device, a type of the third wireless device, a planned transmit power of the second wireless message, and a type of the first wireless device.

For example, in some aspects, if the physical distance between a transmitter of the first wireless message and an intended receiver of the message (the second wireless device) is below a threshold, transmission of the second message may not be deferred by the first wireless device. These aspects may provide for improved downlink reuse when an access point is transmitting a message to a nearby station that will receive a strong signal to noise ratio during the access point's transmission. In some aspects, transmission of the second message may not be deferred if the type of the destination device for the second message (the third wireless device) is an access point. These aspects may provide for improved reuse of uplink bandwidth across access points. In some aspects, transmission of the second message may not be deferred if the type of the first wireless device (the transmitter of the second wireless message) is a station or an access point.

For example, in some aspects, transmission of the second message may not be deferred if the type of device transmitting the second message (the first wireless device) is a station. In some aspects, whether to defer may be further based on whether the physical distance between the destination of the second wireless message (the third wireless device) and the first wireless device is below a threshold. These aspects may provide improved uplink reuse when a station is close to its access point, and is therefore less likely to be close to another access point or that access point's stations.

In some aspects, a planned transmit power of the second wireless message may be used to determine whether the transmission should be deferred. For example, in some aspects, a transmitter may determine whether a transmit power necessary to achieve adequate reception of the second wireless message by the intended recipient may interfere with reception of the first wireless message at its own intended destination. In some aspects, the transmitter of the second wireless message may determine a degree of interference at the intended destination of the first wireless message based on information included in the received portion of the first wireless message (e.g., the preamble of the first wireless message).

For example, the transmitter may determine the degree of interference caused by the transmission of the second wireless message to the intended receiver of the first wireless message based on one or more of the following indications in the portion of the first wireless message: the MCS at which the first wireless message is being sent, the approximate path loss between the transmitter of the first wireless message and the intended recipient of the first wireless message, and the transmit power being used to send the first wireless message. The transmitter may also use other data included in the portion of the first wireless message in addition to the indications listed. The transmitter may then determine whether to defer to the first wireless message at least partially on the degree of interference caused at the intended receiver of the first wireless message by the transmission of the second wireless message.

Furthermore, if the transmitter decides not to defer its transmission to the first wireless message, it may reduce its transmit power while sending the second wireless message so as to reduce interference to the recipient of the first wireless message. More specifically, in some aspects, the first wireless device may compute a path loss from the transmitter of the first wireless message to itself based on a transmit power used to transmit the first wireless message and a received signal strength indication (RSSI) at which it receives the first wireless message. In the following discussion, this path loss is referred to as PLtlt2.

The first wireless device may then choose to transmit the second wireless message only if a transmit power for the second wireless message, P, is such that: P−PLtlt2<T, where T is a threshold. In some aspects, T may be a function of one or more of the following: the MCS used to transmit the first wireless message, and the path loss from the transmitter of the first wireless message to the destination of the first wireless message. In some aspects, one or both of these indications may be included in the portion of the first wireless message received by the first wireless device. In some aspects, the first wireless device may transmit the second wireless message with a reduced transmit power, P, such that: P−PLtlt2<T, where T is defined above.

In some aspects, whether to defer transmission of the second wireless message may be based on one or more indications included in the first wireless message. In some aspects, block 804 may incorporate one or more of the functions discussed above with respect to block 604. The first wireless message received in block 802 may comprise one or more of the indications discussed above with respect to block 602.

Therefore, implementations may consider many indications when determining whether to defer transmission of the second message when another (first) transmission is detected on a wireless medium. For example, both characteristics of the received message (such as the "first" wireless message described by FIG. 6A and/or FIG. 8A) and characteristics of the "to be transmitted message" (the "second" message described above with respect to FIG. 8A) may be considered in some implementations. Table 2 below shows a subset of example combinations of the indications disclosed herein and how one implementation might decide whether to defer transmissions based on those indications. Table 2 represents just one example implementation and should not be considered to be a complete list of possible combinations of the indications disclosed above, nor should it be considered to be the only way these indications may be combined.

circuit 852, deferral circuit 854, and enhanced reuse transmission circuit 856 may be implemented within one or more of the AP HEWC 154 or the STA HEWC 156 discussed above.

In some implementations, the reuse indications receiving circuit 852 may be configured to perform one or more of the functions discussed above with respect to block 802. The reuse indications receiving circuit 852 may include one or more of a programmable chip, a processor, a memory, and a network interface. For example, the reuse indications receiving circuit 852 may include the receiver 412. In some implementations, a means for receiving at least a portion of a wireless message may include the reuse indications receiving circuit 852.

In some implementations, the deferral circuit 854 may be configured to perform one or more functions discussed above with respect to block 804. The deferral circuit 854 may include one or more of a programmable chip, a processor, a memory, and a network interface. For example, the deferral circuit may include the processor 404. In some implementations, a means for determining whether to defer transmission of a wireless message may include the deferral circuit 854.

In some implementations, the enhanced reuse transmission circuit 856 may be configured to perform one or more functions discussed above with respect to block 806. The enhanced reuse transmission circuit 856 may include one or more of a programmable chip, a processor, a memory, and a network interface. For example, the enhanced reuse transmission circuit 856 may include the transmitter 410. In some implementations, a means for transmitting a wireless message based on a deferral determination may include the enhanced reuse transmission circuit 856.

Figure 9A:
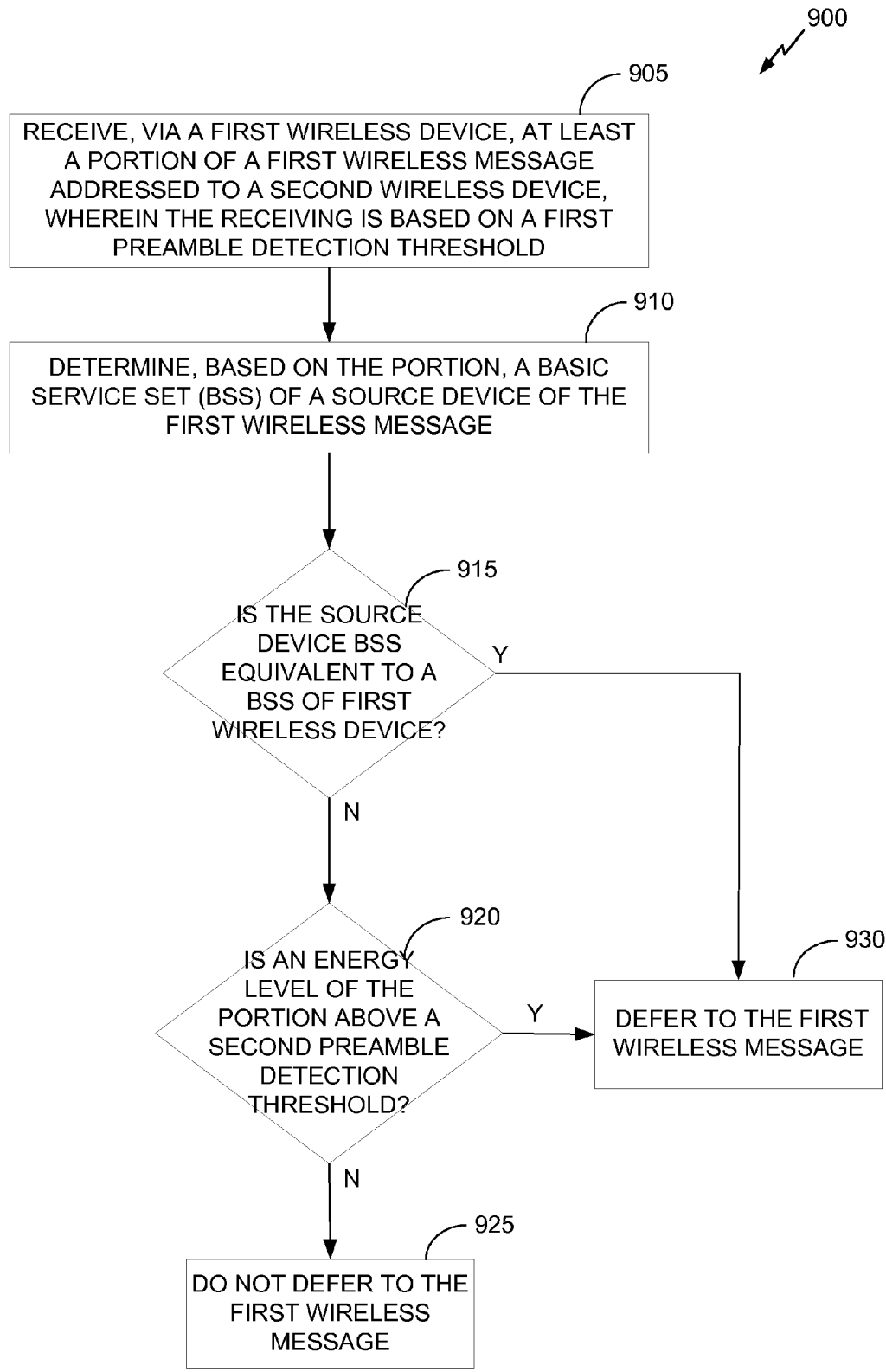
FIG. 9A is a flowchart of a process for determining whether to defer to a message on a wireless network that may be employed within the wireless communication systems 100 of FIG. 1 and 250 of FIG. 2B.

FIG. 9A is a flowchart of a process for determining whether to defer to a message on a wireless network that may be employed within the wireless communication sys-

TABLE 2

| ATTRIBUTES OF TRANSMISSION | | | | ATTRIBUTES OF RECEIVED PORTION | | | | | |
|---|---|---|---|---|---|---|---|---|---|
| Xmitter Type | Dest Type | Distance to Dest | Config from AP | Xmitter Deferral Indication | Dest Type | Source BSS | Xmit Power | Recv Power | Defer? |
| AP | STA | Near | Never Defer | Y | STA | S | Low | Low | N |
| AP | AP | Far | | N | STA | S | High | Low | Y |
| AP | STA | Far | | Y | AP | D | Low | Low | Y |
| STA | AP | Near | | Y | AP | D | High | High | Y |
| STA | STA | Near | | N | STA | S | Low | Low | N |
| STA | AP | Far | Always Defer | N | AP | S | High | Low | Y |

Figure 8B:
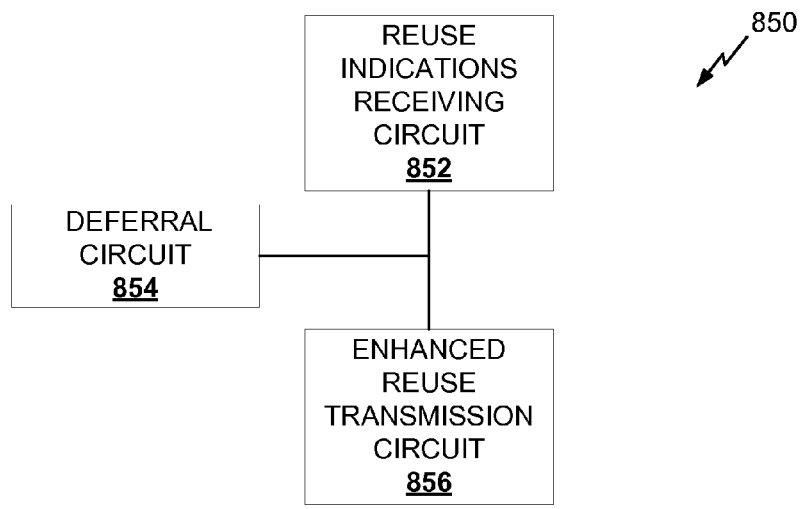
FIG. 8B is a functional block diagram of a wireless communication apparatus that may be employed within the wireless communication systems of FIGS. 1, and 2B.

FIG. 8B is a functional block diagram of a wireless communication apparatus that may be employed within the wireless communication systems of FIGS. 1, 2B, and 3. Those skilled in the art will appreciate that a wireless communication apparatus may have more components than the simplified wireless communication apparatus 850 shown in FIG. 8B. The wireless communication apparatus 850 shown includes only those components useful for describing some prominent features of implementations within the scope of the claims. The wireless communication apparatus 850 may include a receiving circuit 852, a deferral circuit 854, and an enhanced reuse transmission circuit 856. In some aspects, one or more of the reuse indications receiving tems 100 of FIG. 1 and 250 of FIG. 2B. In some aspects, process 900 may be performed by an access point or a station.

Process 900 provides for an improved packet deferral method when operating in dense wireless environments. By unconditionally deferring to packets generated from within the same BSS as the receiving device, process 900 ensures that devices do not interfere with transmissions of other devices within the BSS. For messages received from outside the local BSS, process 900 adds another level of decision making before determining whether to defer.

Messages from outside the local BSS are deferred to based on their received energy level. If the received energy level of the message is above a second, higher detection threshold, process 900 defers to the message, even though it originated from outside the local BSS. However, if the energy level is lower, for example, above the first energy detection threshold but lower than the second energy detection threshold, then process 900 may not defer to the message. This may provide for improved reuse of a wireless medium, in that messages received with a lower energy may be transmitted from devices a greater distance from the receiving device, and thus a transmission by the receiving device may be less likely to interfere with reception of the message by its intended receiver.

In block 905, a first wireless device receives at least a portion of a first wireless message. The first wireless message is addressed to a second wireless device. The reception of the first wireless message is based on a first preamble detection threshold. For example, in some aspects, an energy level of the first wireless message may be above the first preamble detection threshold. Therefore, in these aspects, the first wireless message is detected as a message. In some aspects, process 900 may be performed by the first wireless device.

In block 910, a basic service set of a source device of the first wireless message is determined. In some aspects, the basic service set of the source device may be included in the at least a portion of the first wireless message received in block 905. For example, the source BSS may be included in a preamble of the first wireless message. In some other aspects, the source BSS may be determined based on a source device address of the first wireless message. For example, a device performing process 900 may maintain a mapping from device address to BSS, which can be used to determine the source BSS based on the source device address.

Decision block 915 determines whether the source device BSS is equivalent to the BSS of the first wireless device. If the two BSS's are equivalent, process 900 defers to the first wireless message in block 930.

If the two BSS's are different, decision block 920 determines whether the energy level of the portion received in block 905 is above a second preamble detection threshold. The second preamble detection threshold is higher than the first preamble detection threshold. If the energy level of the portion is above the second preamble detection threshold, then process 900 defers to the first wireless message in block 930. If the energy level of the portion is below the second preamble detection threshold, process 900 does not defer to the first wireless message in block 925.

By not deferring to the first wireless message, a device performing process 900 may transmit a second wireless message during reception of at least a portion of the first wireless message. In other words, transmission of the second wireless message may be performed regardless of whether the first wireless message is still being received. This may result in at least partial concurrent transmission of both the first and second wireless messages.

Figure 9B:
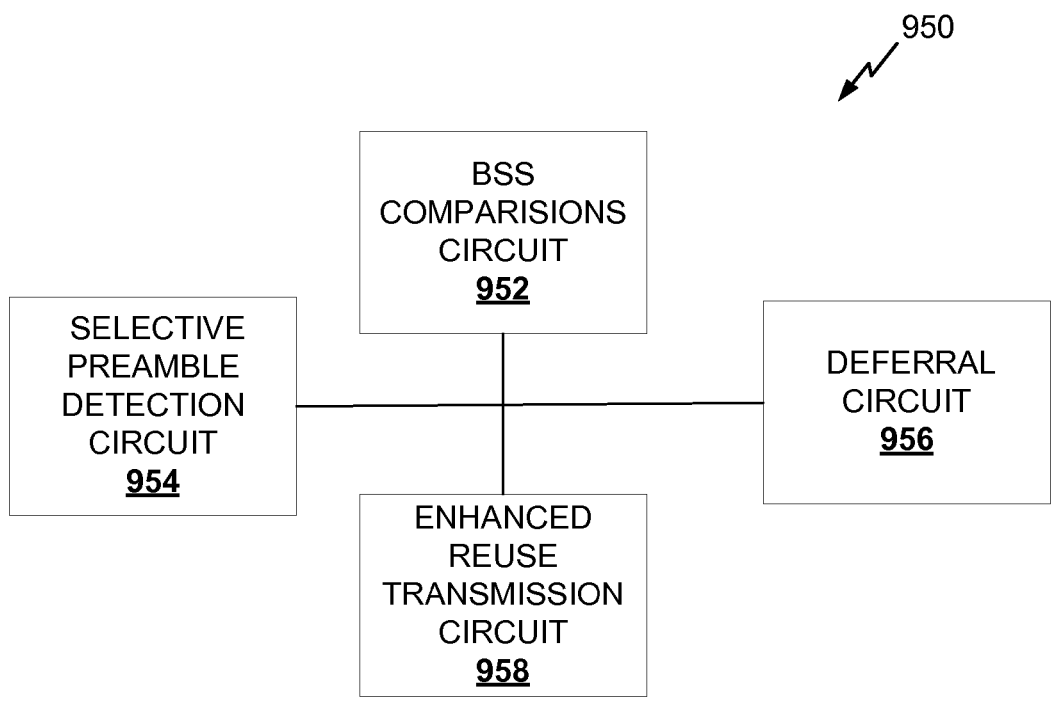
FIG. 9B is a functional block diagram of a wireless communication apparatus that may be employed within the wireless communication systems of FIGS. 1 and 2B.

FIG. 9B is a functional block diagram of a wireless communication apparatus that may be employed within the wireless communication systems of FIGS. 1 and 2B. Those skilled in the art will appreciate that a wireless communication apparatus may have more components than the simplified wireless communication apparatus 950 shown in FIG. 9B. The wireless communication apparatus 950 shown includes only those components useful for describing some prominent features of implementations within the scope of the claims. The wireless communication apparatus 950 may include a BSS comparisons circuit 952, a selective preamble detection circuit 954, a deferral circuit 956, and an enhanced reuse transmission circuit 958.

In some aspects, one or more of the BSS comparisons circuit 952, the selective preamble detection circuit 954, the deferral circuit 956, and/or the enhanced reuse transmission circuit 958 may be implemented within one or more of the AP HEWC 154 or the STA HEWC 156 discussed above.

In some implementations, the BSS comparisons circuit 952 may be configured to perform one or more of the functions discussed above with respect to blocks 910 and/or 915. The BSS comparisons circuit 952 may include one or more of a programmable chip, a processor, a memory, and a network interface. For example, the BSS comparisons circuit 952 may include the processor 404. In some implementations, a means for determining a BSS and/or a means for determining whether two BSSs are equivalent may include the BSS comparisons circuit 952.

In some implementations, the selective preamble detection circuit 954 may be configured to perform one or more functions discussed above with respect to blocks 905 and/or 920. The selective preamble detection circuit 954 may include one or more of a programmable chip, a processor, a memory, and a network interface. For example, the selective preamble detection circuit 954 may include the processor 404. In some implementations, a means for receiving a first wireless message based on a preamble detection threshold, and/or a means for determining whether a message was received with energy above a threshold may include the selective preamble detection circuit 954.

In some implementations, the deferral circuit 956 may be configured to perform one or more functions discussed above with respect to block 930. The deferral circuit 956 may include one or more of a programmable chip, a processor, a memory, and a network interface. For example, the deferral circuit 956 may include the processor 404 and/or the transmitter 410. In some implementations, a means for deferring to a received message and a means for transmitting based on a received message may include the deferral circuit 956.

In some implementations, the enhanced reuse transmission circuit 958 may be configured to perform one or more of the functions discussed above with respect to block 925. The enhanced reuse transmission circuit 958 may include one or more of a programmable chip, a processor, a memory, and a network interface. For example, the enhanced reuse transmission circuit 958 may include the processor 404 and/or the transmitter 410. In some implementations, a means for transmitting a message, and/or a means for transmitting a message based on a deferral decision may include the enhanced reuse transmission circuit 958.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of transmitting a wireless message on a medium, comprising:
    receiving, by a first wireless device, a first portion of a first wireless message transmitted by a second wireless device, wherein the first wireless message includes the first portion and a second portion, and wherein the first portion of the first wireless message comprises a defer field indicating whether the second wireless device requests that devices receiving the first wireless message defer transmissions during reception of the first wireless message;
    receiving the second portion of the first wireless message;
    deferring transmission of a second wireless message during the reception of the second portion of the first wireless message if the defer field indicates the second wireless device requests that transmissions be deferred during reception of the first wireless message; and
    transmitting, by the first wireless device, the second wireless message to the third wireless device at least partially concurrent with the reception of the second portion of the first wireless message by the first wireless device in response to the defer field indicating that the second wireless device does not request that transmissions be deferred during reception of the first wireless message.

2. The method of claim 1, further comprising:
    associating, by the first wireless device, with an access point;

receiving, by the first wireless device, transmission deferral rules from the access point; and determining, by the first wireless device, whether to defer the transmission of the second wireless message during reception of the second portion of the first wireless message based on the deferral rules.

3. The method of claim 1, further comprising determining whether to defer the transmission of the second wireless message during reception of the second portion of the first wireless message based on a type of the first wireless device.

4. The method of claim 1, further comprising:

determining whether a destination device of the first wireless message is either an access point or a station based on an indication of a type of the destination device for the first wireless message; and determining whether to defer the transmission of the second wireless message based on whether the destination device is an access point or a station.

5. The method of claim 4, wherein the deferral of transmission of the second wireless message is based at least in part on the type of destination device for the first wireless message, the type of the first wireless device, and whether a basic service set (BSS) of the second wireless device and a basic service set (BSS) of the first wireless device are equivalent.

6. The method of claim 5, wherein the transmission of the second wireless message is not deferred if the first wireless device is an access point, the destination device for the first wireless message is a station, and the basic service sets are different.

7. The method of claim 5, wherein the transmission of the second wireless message is not deferred if the first wireless device is an access point, the destination device for the first wireless message is an access point, and the basic service sets are different.

8. The method of claim 1, wherein the first portion of the first wireless message further comprises an indication of a transmit power in a preamble of the first wireless message, and the deferral of the transmission of the second wireless message is further based on the transmit power indication.

9. The method of claim 8, further comprising determining whether to defer the transmission of the second wireless message based on the transmit power and a received signal strength of the first wireless message.

10. The method of claim 8, further comprising:

determining a path loss of the first wireless message based on the transmit power of the first wireless message and a received signal strength of the first wireless message; and determining to defer the transmission of the second wireless message if the basic service set of the second wireless device is different than the basic service set of the first wireless device, and the path loss is above a threshold.

11. The method of claim 1, wherein the deferral of transmission of the second wireless message is further based on a distance between the first wireless device and the third wireless device.

12. The method of claim 1, wherein the deferral of transmission of the second wireless message is based on whether a basic service set (BSS) of the second wireless device and a basic service set (BSS) of the first wireless device are different, and whether the defer field indicates the second wireless device requests deferral during transmission of the first wireless message.

13. The method of claim 12, wherein the deferral of transmission of the second wireless message is further based on whether the first wireless device is an access point or a station, and whether the third wireless device is an access point or a station.

14. The method of claim 13, further comprising determining not to defer the transmission despite the defer field indicating deferral is requested if the basic service sets are different, the first wireless device is an access point, and a distance between the first and third wireless devices is below a distance threshold.

15. The method of claim 13, further comprising determining not to defer the transmission of the second wireless message despite the defer field indicating deferral is requested if the basic service sets are different, and both the first wireless device and the destination devices are access points.

16. The method of claim 1, further comprising determining whether to defer the transmission of the second wireless message based, at least in part, on a received signal strength of the first wireless message.

17. The method of claim 16, further comprising determining not to defer the transmission of the second wireless message if a basic service set of the second wireless device is different than a basic service set of the first wireless device, and the received signal strength of the first wireless message is below an energy threshold.

18. The method of claim 17, wherein the determining not to defer the transmission of the second wireless message is further based on the first and second wireless devices being access points.

19. An apparatus for transmitting a wireless message on a medium, comprising:

a receiver configured to receive a first portion of a first wireless message from a first wireless device, the first portion comprising:

a defer field indicating whether the first wireless device requests that receiving devices defer transmissions during reception of the first wireless message, and receive a second portion of the first wireless message;

a processor configured to determine whether to defer transmission of a second wireless message to a second wireless device during the reception of the second portion based, at least in part, on the defer field;

a transmitter configured to defer transmission of the second wireless message during the reception of the second portion of the first wireless message if the defer field indicates the second wireless device requests that transmissions be deferred during reception of the first wireless message and to transmit the second wireless message to the second wireless device at least partially concurrent with the reception of the second portion of the first wireless message by the apparatus in response to the defer field indicating that the second wireless device requests that transmissions be deferred during reception of the first wireless message.

20. The apparatus of claim 19, wherein the processor is configured to determine whether a type of destination of the first wireless message is an access point or a station based on an indication of a type of destination device in the first wireless message, and to defer transmission of the second wireless message based on the type.

21. The apparatus of claim 20, wherein the processor is configured to determine whether to defer the transmission of the second wireless message based at least in part on the type of destination device for the first wireless message, a type of the apparatus, and whether a basic service set (BSS) of the first wireless device and a basic service set (BSS) of the apparatus are equivalent.

22. The apparatus of claim 21, wherein the processor is further configured to determine not to defer the transmission of the second wireless message if the apparatus is an access point, the destination device for the first wireless message is a station, and the basic service sets are different.

23. The apparatus of claim 21, wherein the processor is further configured to determine not to defer the transmission of the second wireless message if the apparatus is an access point, the destination device for the first wireless message is an access point, and the basic service sets are different.

24. The apparatus of claim 21, wherein the processor is further configured to determine whether to defer the transmission of the second wireless message based on a distance between the apparatus and the second wireless device.

25. The apparatus of claim 19, wherein the processor is further configured to associate with an access point and determine whether to defer the transmission of the second wireless message based on at least an indication of transmission deferral rules received from the access point.

26. The apparatus of claim 19, wherein the processor is further configured to determine whether to defer the transmission of the second wireless message based on a type of the apparatus.

27. The apparatus of claim 19, wherein the first wireless message further comprises an indicator of a transmit power in a preamble of the first wireless message, and wherein the processor is further configured to determine whether to defer transmission of the second wireless message based on the indicated transmit power.

28. The apparatus of claim 27, wherein the processor is further configured to determine whether to defer the transmission of the second wireless message based on the transmit power and a received signal strength of the first wireless message.

29. The apparatus of claim 27, wherein the processor is further configured to:
   determine a path loss of the first wireless message based on the transmit power of the first wireless message and a received signal strength of the first wireless message; and
   determine not to defer the transmission of the second wireless message if the basic service set of the second wireless device is different than the basic service set of the first wireless device, and the path loss is below a threshold.

30. The apparatus of claim 19, wherein the processor is configured to determine whether to defer the transmission of the second wireless message based on whether a first wireless device basic service set (BSS) and a basic service set (BSS) of the apparatus are different, and whether the defer field indicates whether the first wireless device requests that receiving devices defer transmissions during the reception of the first wireless message.

31. The apparatus of claim 30, wherein the processor is configured to determine whether to defer the transmission of the second wireless message based on whether the apparatus is an access point or a station, and whether the second wireless device is an access point or a station.

32. The apparatus of claim 31, wherein the processor is configured to determine not to defer the transmission of the second wireless message despite the defer field indicating deferral is requested if the basic service sets are different, the apparatus is an access point, and a distance between the apparatus and the first wireless device is below a distance threshold.

33. The apparatus of claim 31, wherein the processor is configured to not defer the transmission of the second wireless message despite the defer field indicating deferral is requested in the first wireless message if the basic service sets are different, and both the apparatus and the destination device are access points.

34. The apparatus of claim 19, wherein the processor is further configured to determine whether to defer the transmission of the second wireless message based, at least in part, on a received signal strength of the first wireless message.

35. The apparatus of claim 34, wherein the processor is further configured to determine not to defer the transmission of the second wireless message if a basic service set of the second wireless device is different than a basic service set of the first wireless device, and the received signal strength of the first wireless message is below an energy threshold.

36. The apparatus of claim 34, wherein the processor is further configured to determine not to defer the transmission of the second wireless message if the first and second wireless devices are access points.

37. A method of transmitting a message within a wireless network, the wireless network utilizing carrier sense media access, the method comprising:
   generating, by a first wireless device, a first wireless message, the message including a defer field indicating whether the first wireless device requests that devices receiving the first wireless message defer their own transmissions during transmission of the first wireless message; and
   transmitting by the first wireless device, the first wireless message, wherein the first message is further generated to indicate whether a destination device of the first wireless message is a station or an access point.

38. An apparatus for transmitting a message within a wireless network, the wireless network utilizing carrier sense media access, the apparatus comprising:
   a processor configured to generate a first wireless message, the message comprising a defer field indicating whether the apparatus requests that devices receiving the first wireless message defer their own transmissions during transmission of the first wireless message; and
   a transmitter configured to transmit the first wireless message, wherein the processor is further configured to generate the first wireless message to indicate whether a destination device is a station or an access point.

* * * * *